W. G. BABCOCK.
TYPE WRITER.
APPLICATION FILED APR. 30, 1900.

934,786.

Patented Sept. 21, 1909.
10 SHEETS—SHEET 1.

Witnesses:
Raphaël Netter
C. D. Morrill

William G. Babcock, Inventor
By Attorney F. W. Hillard

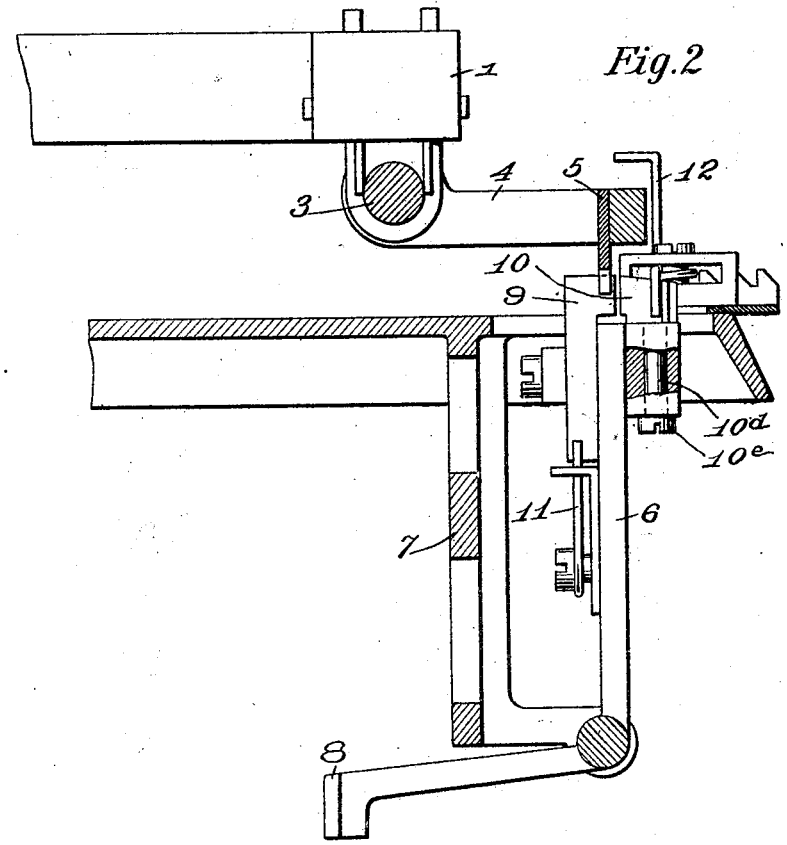
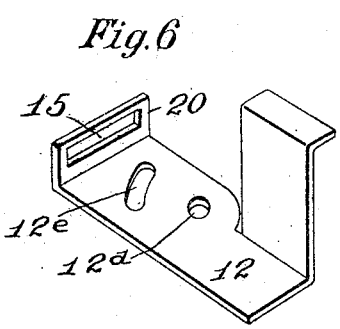
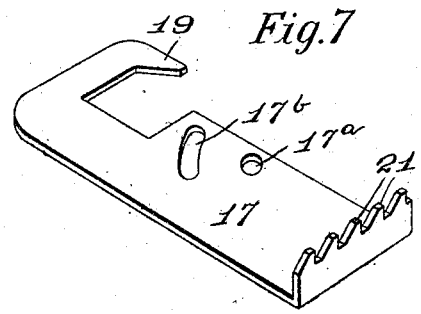

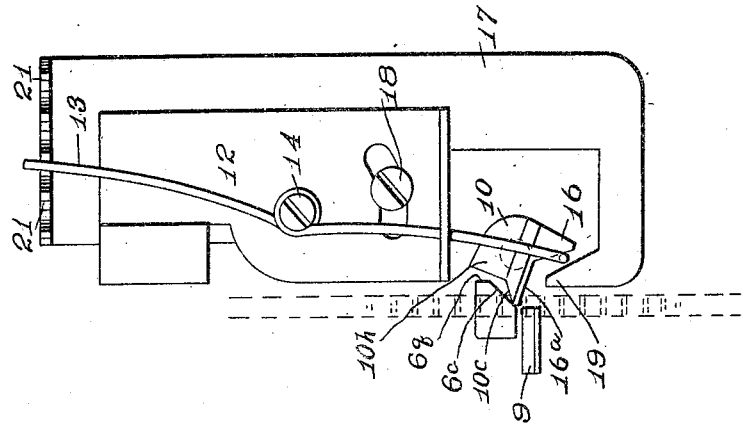
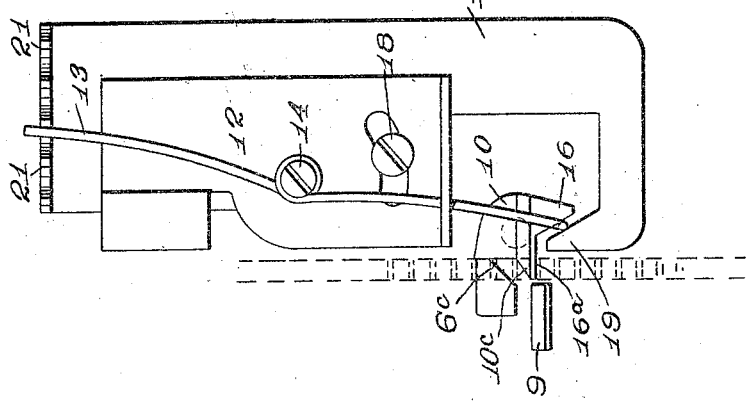
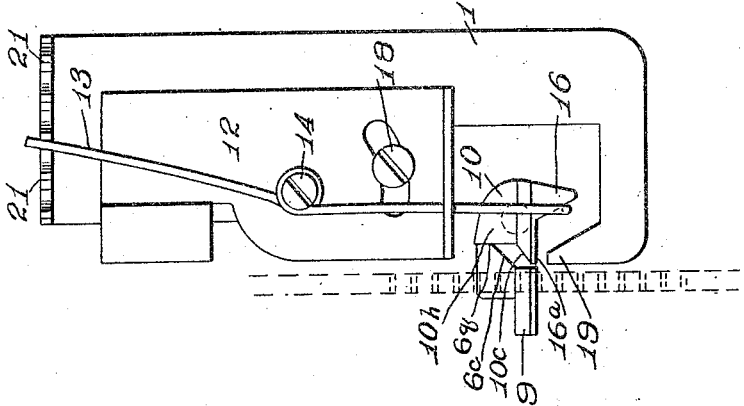

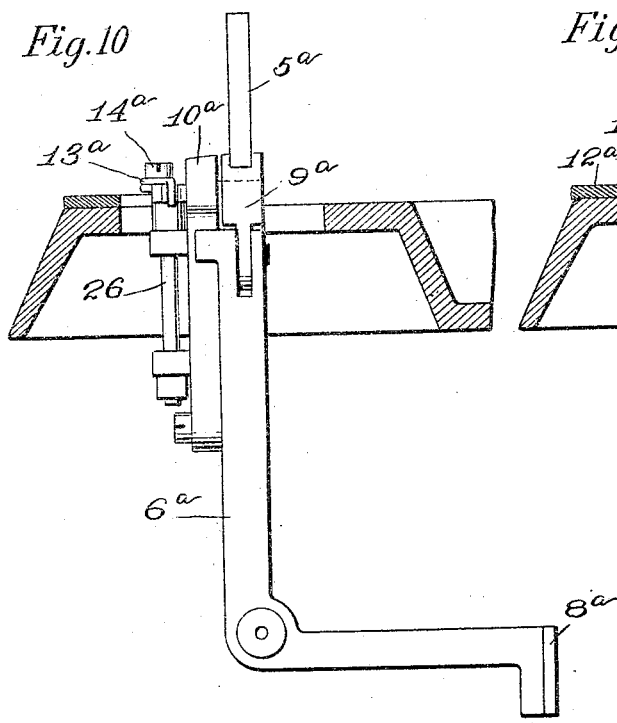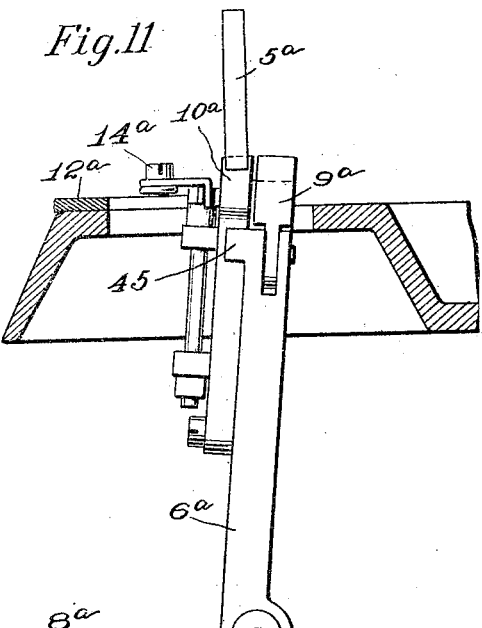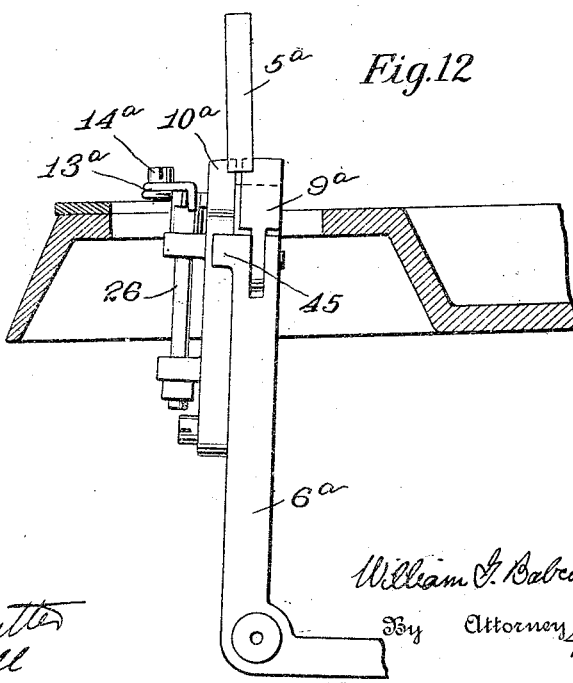

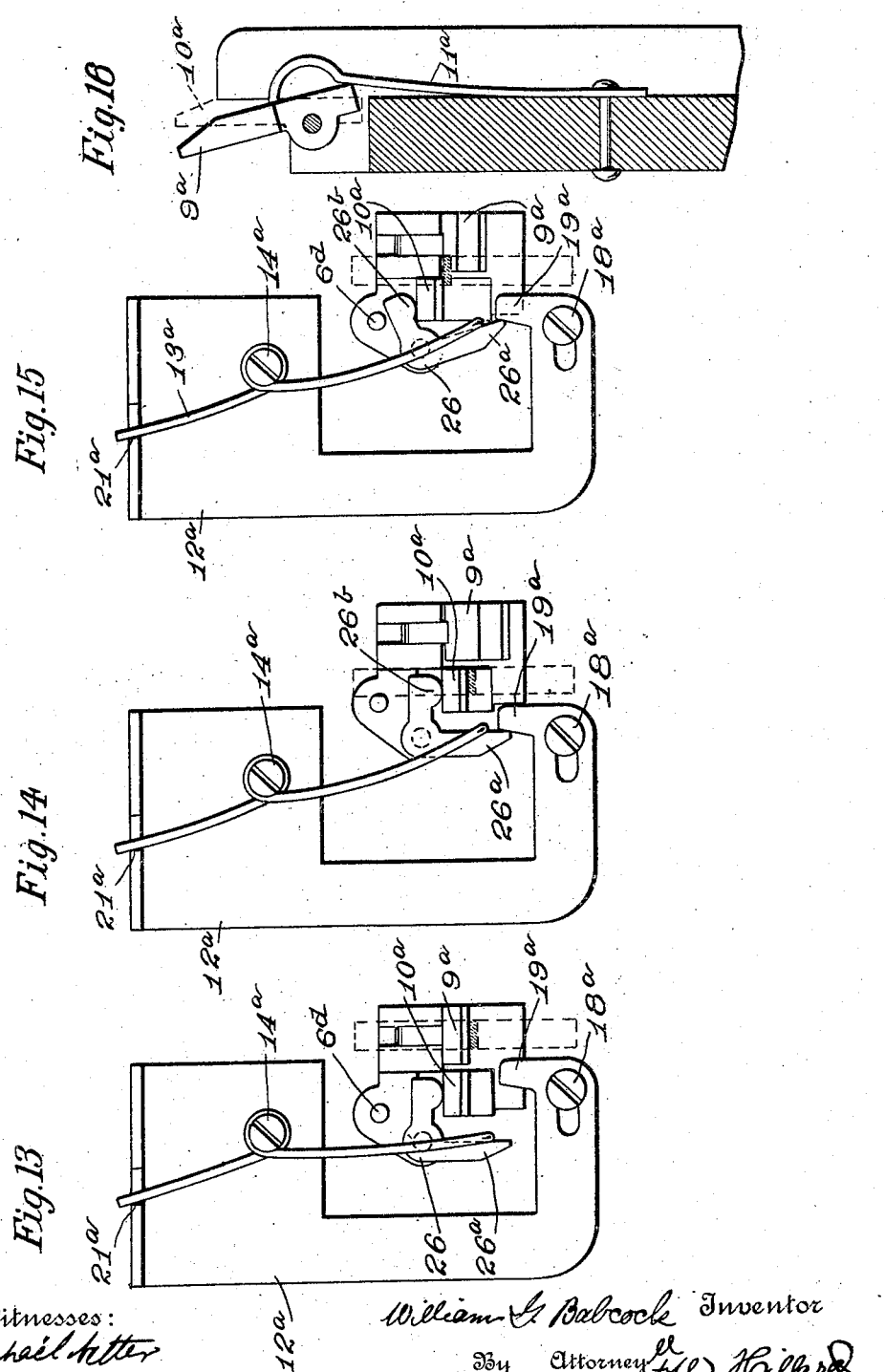

W. G. BABCOCK.
TYPE WRITER.
APPLICATION FILED APR. 30, 1900.

934,786.

Patented Sept. 21, 1909.
10 SHEETS—SHEET 6.

WITNESSES
E. J. O'Connor
Joseph L. A. McMenamin

INVENTOR
William G. Babcock
By Frederic W. Hillard
ATTORNEY

W. G. BABCOCK.
TYPE WRITER.
APPLICATION FILED APR. 30, 1906.

934,786.

Patented Sept. 21, 1909.
10 SHEETS—SHEET 7.

WITNESSES
E. J. O'Connor
Joseph L. A. McMenamin

INVENTOR
WILLIAM G. BABCOCK
Frederic W. Hillard
ATTORNEY

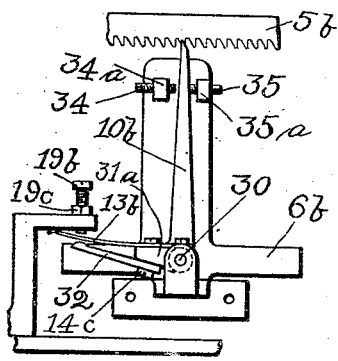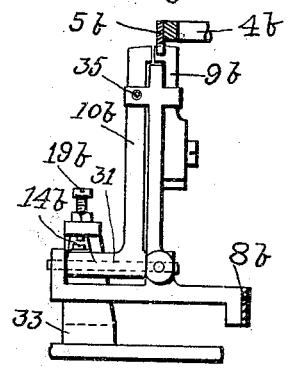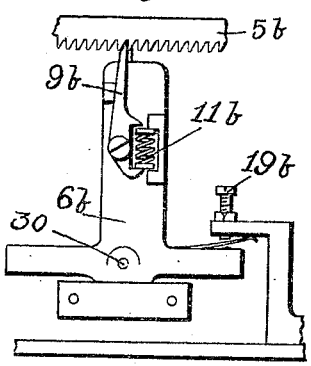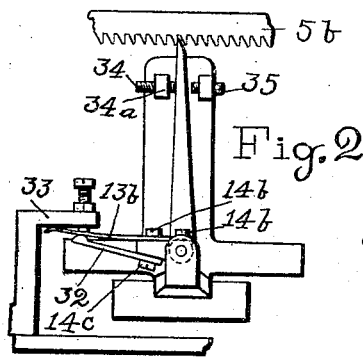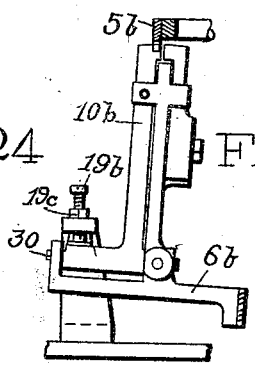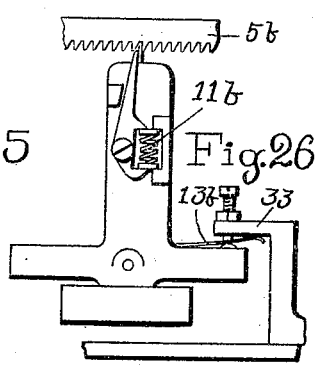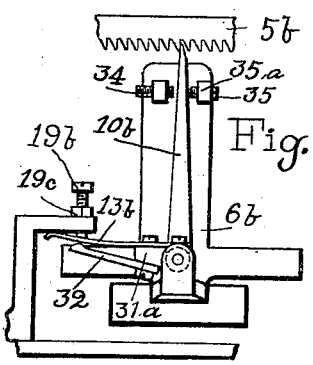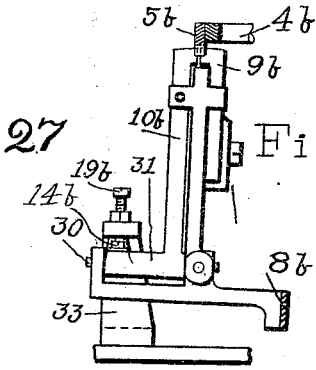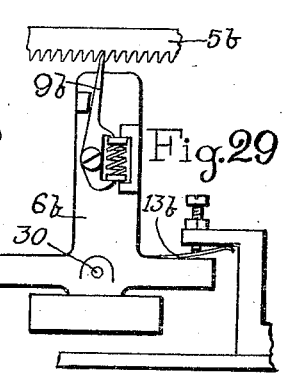

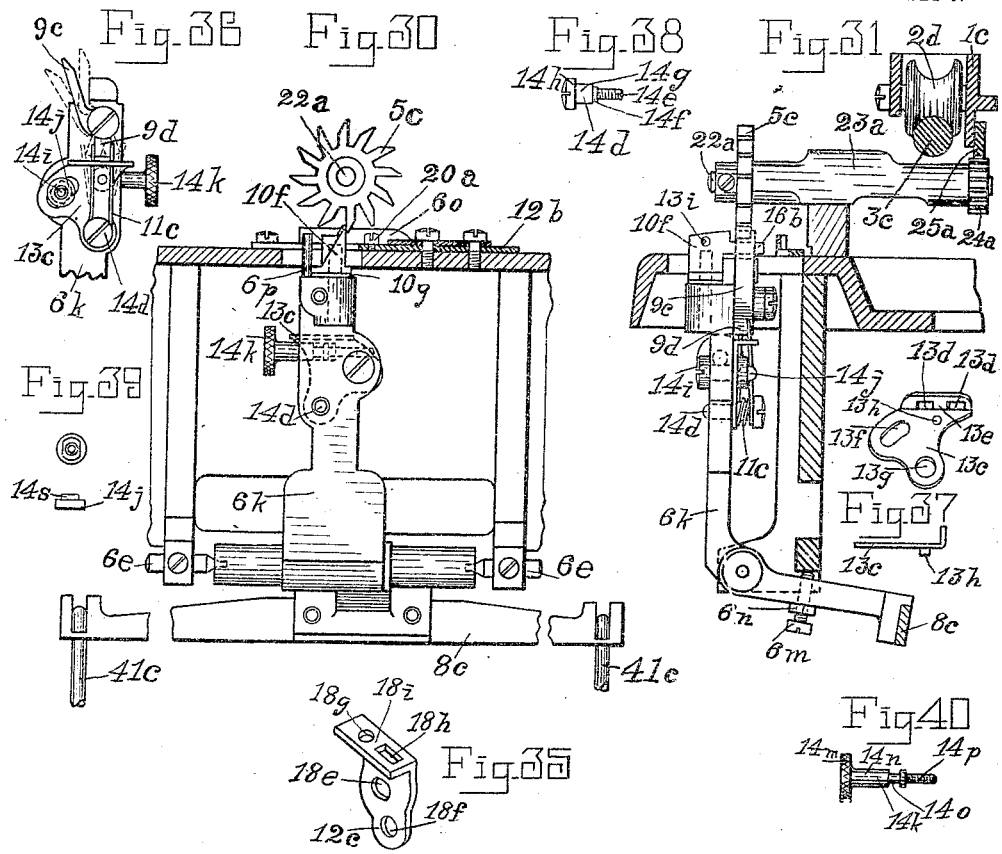

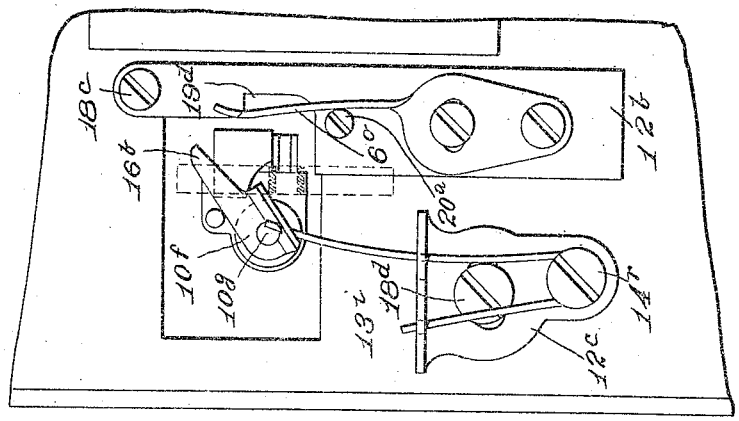
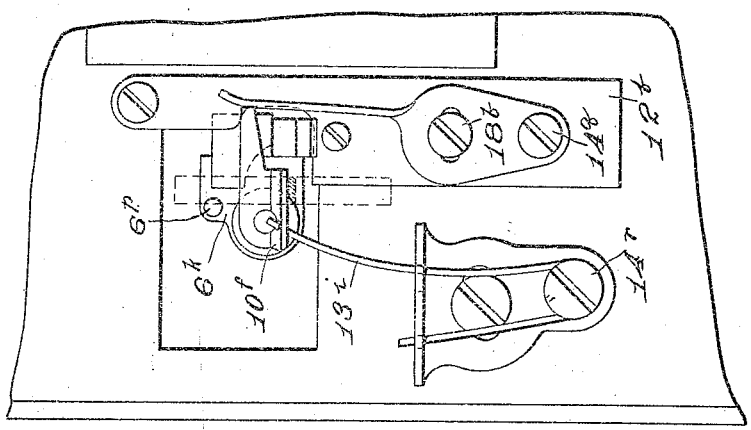
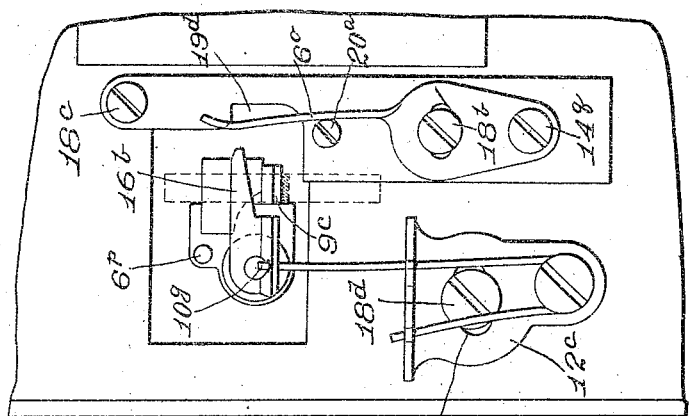

UNITED STATES PATENT OFFICE.

WILLIAM G. BABCOCK, OF NEW YORK, N. Y., ASSIGNOR TO FREDERIC W. HILLARD, OF TOTTENVILLE, NEW YORK.

TYPE-WRITER.

934,786.  Specification of Letters Patent.  Patented Sept. 21, 1909.

Application filed April 30, 1909.  Serial No. 14,866.

*To all whom it may concern:*

Be it known that I, WILLIAM G. BABCOCK, a resident of the borough of Brooklyn, in the county of Kings and city and State of New York, have invented certain new and useful Improvements in Type-Writers, of which the following is a specification.

My invention is an improvement in typewriting machines, one main object being to increase the efficiency of the escapement mechanism.

The invention relates particularly to escapements of the style broadly described in United States Patents Nos. 554,874 dated Feb. 18, 1896, 577,982, March 2, 1897, 580,281, Apr. 6, 1897, and 616,840, Dec. 27, 1898, to F. W. Hillard, and in my United States Patent No. 617,798, dated January 17th, 1899.

The invention also consists in the various details of construction shown.

I show and describe herein four modifications of my invention. Two of the constructions are provided with plane racks, and are of the general #2 Remington typewriter style. The other two forms are provided with escapement wheels, having engaging teeth at the periphery thereof that are movable with the carriage and relatively thereto at a higher rate of speed than that of the carriage in the feeding movement, as in the No. 6 Remington typewriter. A mechanic can readily adapt the invention to other typewriters.

Figure 1:
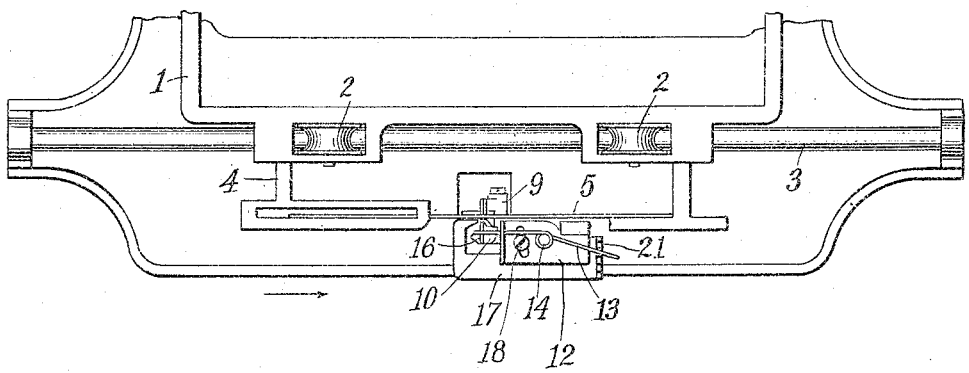
Figure 8:
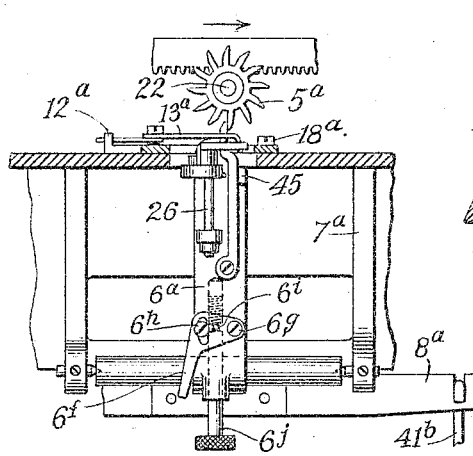
Figure 9:
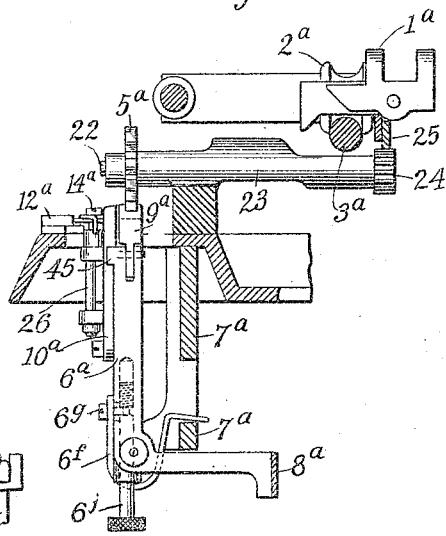
Figure 17:
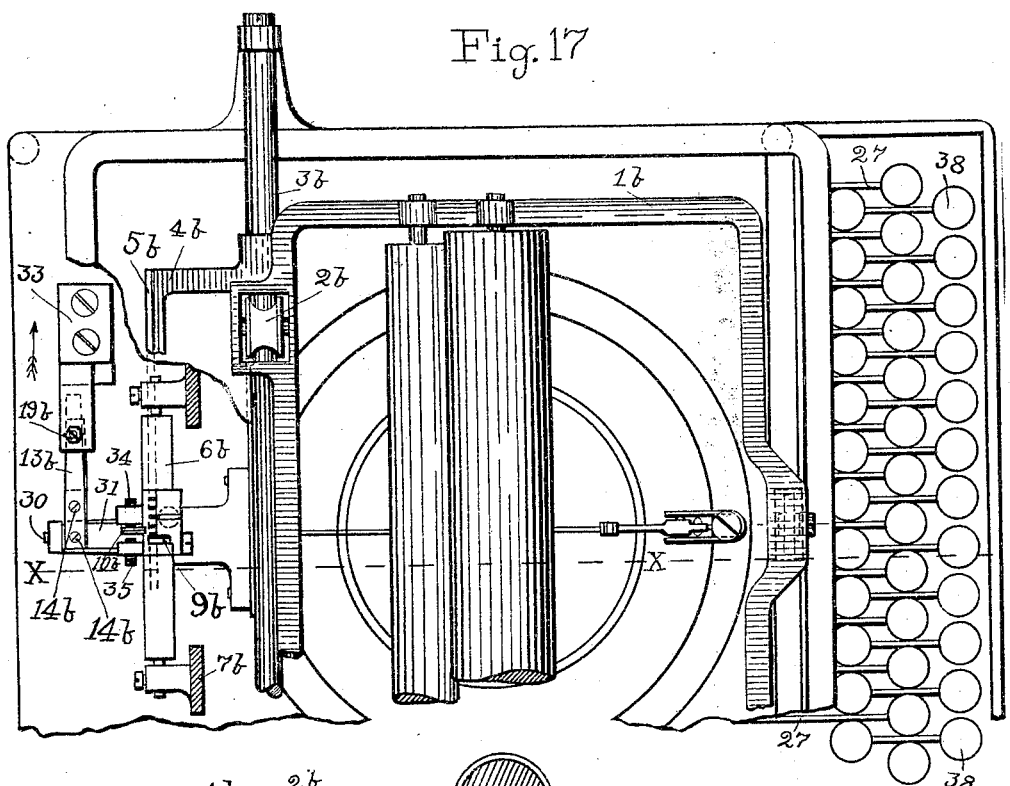
Figure 18:
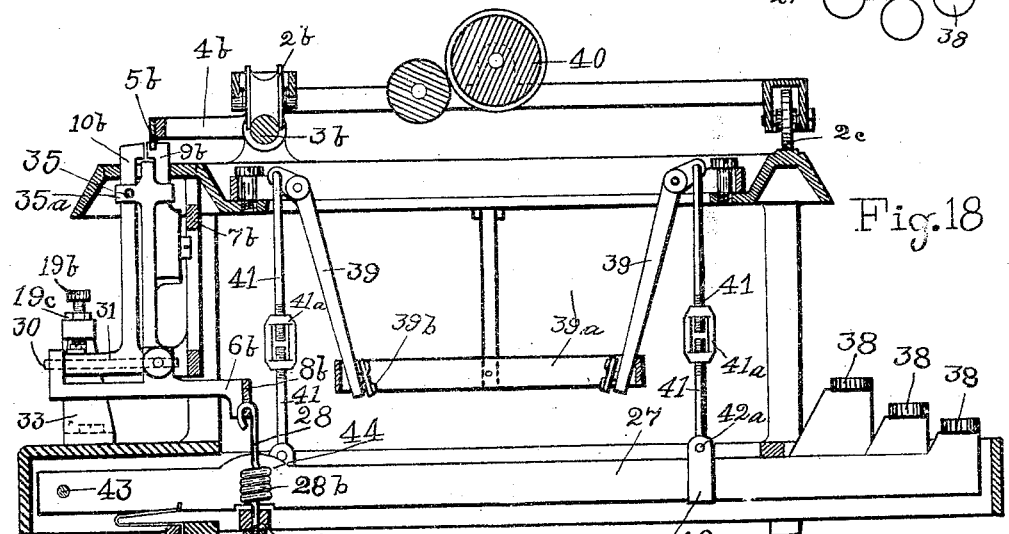
Figure 19:
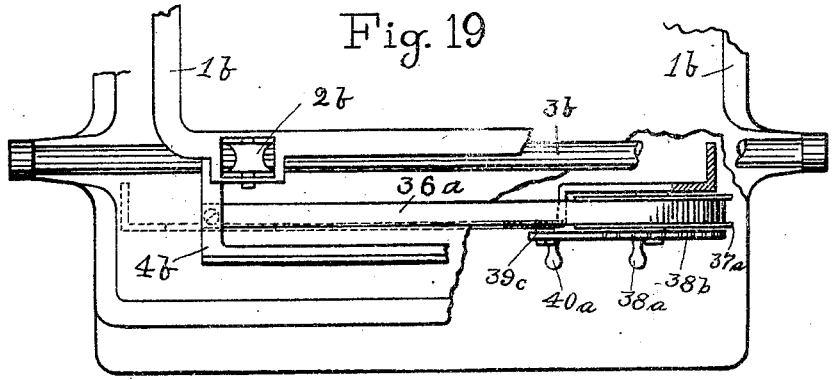
Figure 20:
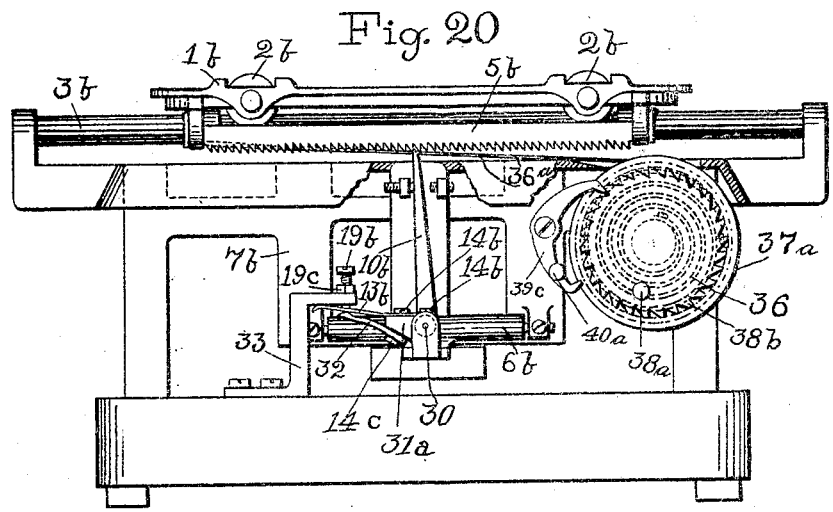

In the accompanying drawings which form a part of this specification. Figures 1 to 7 inclusive show one form of my invention. Fig. 1 is a plan view of the rear part of the typewriter showing the escapement. Fig. 2 is a side view partly in section of the escapement and parts of the typewriter, as seen from the left hand end of the machine looking in the direction of the arrow on Fig. 1. Figs. 3, 4 and 5 are positional plan views of the two dogs, the swiveling spring and its holder, the dog holding and swiveling plate, etc. Fig. 3 is a view of the parts in the normal unused condition of the machine. Fig. 4 is a view of the parts when the key is fully depressed. Fig. 5 is a view of the parts after the key has been released and the swivel dog moved into its forward position, but before it has escaped from the rack. In Figs. 3, 4 and 5 the position of the rack teeth is shown in dotted lines. Figs. 6 and 7 are respectively detail views of the rack guard and spring holder and of the dog holding and swiveling plate. Figs. 8 to 16 inclusive show a modification of my invention. Fig. 8 is a rear view partly in section. Fig. 9 is a side view as seen from the right hand end of Fig. 8 with many parts of the machine cut away. Figs. 10, 11 and 12 are positional side views, looking at the machine from the same position as in Fig. 9. Fig. 10 is a view of the parts in the normal unused condition of the machine. Fig. 11 shows the position when the key is fully depressed. Fig. 12 shows the position after the release of the key and when the key is part way lifted. Figs. 13, 14 and 15 are positional plan views of the dogs and plate, etc., corresponding respectively to the positions shown in Figs. 10, 11 and 12. Fig. 16 is a detail view of the feed dog and its spacing spring. Figs. 17 to 29 inclusive show another modification of my invention. Fig. 17 is a plan view of a portion of the typewriter, many of the parts being broken away or removed. Fig. 18 is a side elevation of the machine, looking in the direction of the arrow on Fig. 17, the parts being cut away on the line X—X of Fig. 17. Fig. 19 is a plan view of several of the rear parts of the typewriter, showing the mechanism of the carriage propelling power. Fig. 20 is a rear elevation showing the mechanism of the carriage propelling power, together with the escapement rocker and some of the parts mounted thereon, and the rack and rear running gear of the carriage. Figs. 17, 18 and 20 show the escapement in the normal unused condition of the machine. Figs. 21 to 29 inclusive are positional views of the escapement. Figs. 21, 22 and 23 are respectively rear, side and front views and show the parts when they are nearly returned to normal position after the depression and release of a key. Figs. 24, 25 and 26 are corresponding views showing the parts when the key is fully depressed. Figs. 27, 28 and 29 show the position after the key has been released and midway lifted to its raised position. Figs. 30 to 40 inclusive show still another modification of my invention. Fig. 30 is a rear view partly in section. Fig. 31 is a side view as seen from the right hand side of Fig. 30 with many parts of the machine cut away. Figs. 32, 33 and 34 are positional plan views of the dogs, the springs, holding plate, etc. Fig. 32 is a view of the parts in the normal unused condition of the machine. Fig. 33 shows the position when a key is fully depressed. Fig. 34 shows the position after the release of the key and when the key is part way lifted. Fig. 35 is a detail view of the plate which holds the swivel dog spring. Fig. 36 is a detail view of the feed dog and its spacing spring and controlling mechanism. Figs. 37, 38, 39 and 40 are detail views of different parts of the mechanism for holding the feed dog in its normal central position and for adjusting such position.

Referring to the construction of Figs. 1 to 7 inclusive, the carriage 1 is mounted on the machine in the usual manner, being supported at the rear by rollers 2 2 which are in turn mounted on guide rail 3; and the rack frame 4 is hinged to the carriage frame and supports the rack 5. All these parts may be of the usual construction and are mounted in the ordinary manner. The escapement rocker 6 is pivoted upon the frame work 7 of the machine and at its lower end has an arm which extends forward toward the front of the machine and supports the cross bar 8. The cross bar may be connected with the universal bar and key levers by adjustable connecting wires in the usual manner. The connecting wires and their turnbuckles, the universal bar and key levers are not shown in Figs. 1 to 7, but they may be of the usual #2 Remington construction. I have however shown, in Figs. 17 to 29, a connecting wire between the escapement cross bar and the universal bar which is coiled into a spiral spring, whereby, after the escapement rocker has been depressed to the desired extent, the keys may be still further depressed without movement of the rocker. Connecting wires of the same character may, if desired, be employed with Figs. 1 to 7. The special connecting wire referred to will be hereinafter fully described.

At the upper end of the escapement rocker are mounted the feed dog 9 and the swivel dog 10. The feed dog 9 is pivoted to the rocker and is provided with a spacing spring 11 which holds the dog normally in a central intermediate position, and which both moves it backward to effect the spacing and also moves it forward after it has been tripped out of the rack. Spring 11 is of the same general style as spring 11$^c$ of Figs. 30 to 40 which will be hereinafter fully described. In the normal position (shown in Figs. 1 and 3) the feed dog 9 rests against the abutment 6$^c$ at the upper end of the rocker 6, the abutment 6$^c$ being an integral part of the rocker 6 and provided with banking faces to limit respectively the forward position of dog 9 and the forward and rearward positions of dog 10 on the rocker. In the forward position of the swivel dog 10, the front face 10$^c$ thereof banks against abutment 6$^c$ and in the rearward position of the dog on the rocker the portion 6$^a$ thereof banks against the abutment 6$^c$. Mounted on the top plate of the machine is the combined rack guard and spring holder 12, which supports the swivel dog spring 13. Looking at the machine from the rear, the swivel dog spring 13 consists of a coiled part which surrounds screw 14, a straight part which extends toward the right hand end of the machine and another straight part which extends toward the left hand end of the machine, the latter part passing through the slot 15 provided for the purpose in the bent up portion of the left hand end of the spring holder 12. After passing through the slot 15 the end of the spring passes over the top of swivel dog 10 and is then bent down to rest against and in front of the holding arm 16 of the swivel dog. The spring 13 swivels dog 10 rearwardly from its inclined position shown in Fig. 5 to its uninclined position shown in Fig. 3, and the spring also swings the escapement rocker outwardly so as to disengage dog 10 from the rack and to engage dog 9 therewith. Dog holding and swiveling plate 17 is mounted on the top plate of the machine below spring holder 12, the spring holder and holding and swiveling plate both being clamped to the machine by the swivel dog spring screw 14 and by the clamping screw 18. The spring holder and the holding and swiveling plate are provided with holes, 12$^d$ and 17$^a$ respectively, through which screw 14 passes. Screw 14 is provided with a threaded part which passes through the spring holder 12 and the plate 17 into the top plate of the machine, and the screw is provided with a body part larger than the threaded part which rests on top of the spring holder and clamps the spring holder and the plate down in position on the top plate of the machine. The screw is also provided with an enlarged head above the spring 13 so that the spring cannot accidentally become disengaged from the screw. Spring holder 12 and plate 17 are also provided with slots, 12$^b$ and 17$^b$ respectively, through which clamping screw 18 passes, these slots being concentric with the holes 12$^d$ and 17$^a$ through which screw 14 passes, so that the spring holder and plate can be swung for a limited distance around screw 14 as a pivot. This adjustment is for the purpose of swinging plate 17 in or out so as to swing point 19 to the desired position for controlling dog 10. The slot 12$^c$ in spring holder 12 permits the spring holder to be swung to correctly position slot 15 for the movement of spring 13 inwardly and outwardly when the keys are depressed and when they are released. By adjusting the spring holder so that the inner end 20 of slot 15 engages with spring 13 just before the end of the depression of the key an additional tension may be imparted to the end of the spring acting on swivel dog 10 and on the escapement rocker 6, this additional tension forming a "repulser" for the key at the bottom of the stroke. Plate 17 is also provided at its right hand end with a series of slots 21 21. The free end of spring 13 can be placed in either one of these slots, thereby increasing or decreasing the tension of the spring at will.

The swivel dog 10 comprises a shank $10^d$ extending downwardly and inserted in a socket provided to receive it on the rocker 6. In Fig. 2 I have shown the socket on the rocker broken away so as to show a portion of the shank $10^d$. At its lower extremity the shank is drilled out and threaded to receive a check screw $10^e$, the purpose of which is to prevent the dog from being accidentally drawn up out of its socket on the rocker. At its upper end the dog is provided with holding arm 16, previously described, and with the rack engaging arm $16^a$.

In the modification of Figs. 8 to 16 inclusive the carriage $1^a$ is mounted at the rear on rollers $2^a$ supported by guide rail $3^a$. In this construction an escapement wheel $5^a$ engages with the dogs, in place of the plane rack 5 of the construction above described. The escapement wheel is rigidly mounted on a shaft 22 which extends through the support 23 and on its opposite or inner end is provided with a pinion 24 that engages with the carriage rack 25. The escapement wheel $5^a$ is of larger diameter than the pinion 24, as shown in Fig. 9. The pinion 24 meshes with the carriage rack 25 and therefore moves at the same rate of speed as the carriage feed. Hence it follows that the escapement wheel moves at its periphery at a speed higher than that of the carriage feed, and as the engaging teeth of the wheel are at the periphery thereof, they also move with the carriage and relatively thereto at a rate of speed higher than that at which the carriage moves in letter spacing. The escapement wheel and pinion may be of the usual construction and need no further description here. The escapement rocker $6^a$ is pivotally mounted on the frame work $7^a$ of the machine and at its lower end is provided with an arm which extends inwardly toward the front of the machine and carries cross bar $8^a$ which may be adjustably connected with the universal bar and key levers by means of connecting wires $41^b$ (the upper end of one of which is shown marked $41^b$ in Fig. 8 of the drawings) hung at each end of the cross bar and threaded into the universal bar in the usual #2 Remington manner; or connecting wires of the character of the universal bar connecting wires shown in Figs. 17 to 29 may be employed to connect bar $8^a$ with the universal bar (see Fig. 18 connecting wire 28 and its spring $28^b$). Mounted upon the escapement rocker is the feed dog $9^a$, which normally engages with the escapement wheel, and the dog $10^a$ which is normally disengaged from the escapement wheel. The feed dog when out of engagement of the escapement wheel is normally controlled in the central intermediate position shown in Fig. 16 by its spacing spring $11^a$. The spacing spring is of a well known style and needs no further description.

Mounted on the top of the frame work of the machine is the spring holder $12^a$ which supports swiveling spring $13^a$, the swiveling spring being coiled about screw $14^a$; the screw $14^a$ also serving to clamp the spring holder to the frame work of the machine. The swiveling spring in this construction is substantially similar to the swiveling spring of the construction of Figs. 1 to 7. One end of the spring passes through slot $21^a$ in the spring holder $12^a$ and the other end passes over the top of the swiveler 26 and is bent down on the inner side of its holding arm $26^a$, so as to both swing the swiveler, thereby moving the dog $10^a$ rearwardly, and also to move the escapement rocker $6^a$ outwardly on its pivot and disengage dog $10^a$ from the escapement wheel and engage dog $9^a$ therewith. Spring holder $12^a$ is provided with a clamping screw $18^a$ which passes through a slot in the spring holder, the slot being provided in the spring holder so that the spring holder can be moved inwardly or outwardly on the machine to bring point $19^a$ into the proper position for holding arm $26^a$ of the swiveler when the key is depressed, thereby controlling dog $10^a$ in its rearward position while the printing is taking place. In this construction holding part or point $19^a$ is formed integral with the spring holder $12^a$, instead of on a separate plate as shown in the construction of Figs. 1 to 7 inclusive. In this modification only a single slot $21^a$ is shown for tensioning spring $13^a$, but any number of slots may be provided, as in the construction of Figs. 1 to 7, for varying the tension of the spring if desired.

Mounted near the pivotal end of the dog rocker is a spring $6^f$. This spring is punched out of sheet metal, bent into the desired shape, spring tempered and pivotally connected with the dog rocker by screw $6^g$. The screw $6^g$ is provided with a threaded part which is inserted into the rocker $6^a$, a body part upon which spring $6^f$ is pivoted and which is of larger diameter than the threaded part of the screw, and a slotted head of still larger diameter. The spring is therefore held on the body of the screw between the slotted head of the screw and the body of the escapement rocker. The spring is also provided with a curved slot concentric with the pivot hole of screw $6^g$, and through this slot is passed the binding screw $6^h$, the rocker being threaded in line with the slot to receive the binding screw. The binding screw is provided with a head and with a threaded part, but is without an enlarged body. This spring can therefore be screwed into the rocker until spring $6^f$ is securely bound in position between the head of screw $6^h$ and the body of the rocker. The spring passes from the rear of the escapement rocker down below the shaft of the rocker, then is bent up again and finally bent inwardly so that it rests over the frame $7^a$ of the typewriter. By means of the pivotal screw $6^g$ and binding screw $6^h$ the inner end of the spring can be lowered so as to rest upon frame $7^a$ either at any or all parts of the movement, or it may be swung up so high that it does not rest upon the frame $7^a$ at all. This spring is adjustable to suit the requirements of the operator. With many operators it is adjusted so as to come into action slightly before the type strikes the platen for printing, thereby constituting a " repulser spring ".

By setting spring $6^f$ so as to engage frame $7^a$ at all parts of the movement of the dog rocker, swiveling spring $13^a$ may, if desired, be discarded altogether; the rocker being in this case returned to and controlled in its normal position by spring $6^f$, and dog $10^a$ being swung rearwardly into line with dog $9^a$ by swiveler 26 and its plate $12^a$, during the depression of a key. In this case the spring $6^f$ operates in substantially the manner in which the ordinary spacing rocker returning spring operates in the Remington typewriter. That is, at every period of the cycle of movement of the parts the spring $6^f$ exerts force for returning the spacing rocker to its normal position and holding it there. If, under these circumstances, the swiveling spring $13^a$ be entirely dispensed with, the carriage main spring will, after the operative movement of the parts and the release of the type actuating key, pull the carriage forward and thereby cause the escapement wheel $5^a$ to revolve in unison therewith while the dog $10^a$ is still engaged with the escapement wheel; thus pulling the dog $10^a$ into its forward position on the rocker and swinging the swiveler 26 into the position shown in Fig. 15. This forward movement of the dog $10^a$ upon the rocker and corresponding swinging of swiveler 26, as shown in Fig. 15, occurs after the release of the key and during the return movement of the parts. In case spring $13^a$ is discarded, there will then be no means for moving the dog rearwardly upon the rocker until the spacing rocker is again operated by the depression of a key. But, upon the depression of a type actuating key, as soon as the arm $26^a$ of the swiveler contacts with point $19^a$ of plate $12^a$, the contacting point of the arm $26^a$ is brought to rest while the spacing rocker is still swinging inwardly. This continued inward movement of the spacing rocker then causes the swinging of the swiveler from the position shown in Fig. 15 to the position shown in Fig. 14, thereby causing the arm $26^b$ of the swiveler to move the dog $10^a$ rearwardly upon the spacing rocker while it is being brought into engagement with a rack tooth. Therefore, under the circumstances which I am now describing, the dog $10^a$ is moved rearwardly upon the spacing rocker by the swiveler, during the type actuating movement of the keys; and it is moved forwardly thereon by the carriage main spring during the return movement of the rocker after the release of the depressed key. Spring $6^f$, and its adjusting means shown in Figs. 8 to 16, may be employed with Figs. 1 to 7, and spring 13 may then be discarded in the same manner as spring $13^a$ of Figs. 8 to 16, if desired. Spring $6^f$ is also provided with an adjusting pin $6^i$, which is riveted into the spring and passes inwardly into the rocker, through a hole therein provided to receive it, into a slot into an adjusting screw $6^j$ which controls it. By means of the adjusting screw $6^j$ and the pin $6^i$ the spring $6^f$ can be adjusted upon the rocker $6^a$.

In the modification of Figs. 17 to 29, the carriage $1^b$ is mounted at the rear on rollers $2^b$ $2^b$ which are supported on guide rail $3^b$, and at the front it is mounted on roller $2^c$ supported on a guide way upon the frame work of the machine; and the rack frame $4^b$ is hinged to the carriage and supports the rack $5^b$. All of these parts may be of the ordinary Remington construction. The escapement rocker $6^b$ is pivoted to the frame work $7^b$ of the machine and at its lower front end there is the usual cross bar $8^b$ which serves to connect it with the key levers 27 by means of connecting wires 28 28 and the universal bar 29. The two connection wires 28 28 are each at their upper ends bent around and hooked over cross bar $8^b$. At their lower ends they are inserted through holes in the universal bar bored out to receive them, and beneath the universal bar the adjusting nuts $28^a$ are screwed on to the ends of the wires. Therefore each end of the cross bar $8^b$ is connected with the corresponding end of the universal bar 29 by means of a connecting wire 28. The distance between the cross bar and the universal bar can be regulated at either end by lengthening or shortening the distance between the upper hooked end of the connecting wire and the adjusting nut $28^a$, by screwing the nut upwardly or downwardly upon the wire.

Between their points of connection with cross bar $8^b$ and universal bar 29 the connecting wires 28 may be formed into spiral springs 28$^b$, the function of which will be hereinafter pointed out.

The escapement rocker carries the feed dog 9$^b$ and cam spacing dog 10$^b$. The feed dog is pivoted upon the escapement rocker and is controlled when out of the rack in a normal central position by its spacing spring 11$^b$. The cam spacing dog is pivoted upon the escapement rocker by pivot shaft 30, and is provided with a pivotal part 31 and an upwardly extending part which at its upper end engages with the rack, constituting dog 10$^b$. It is also provided with a horizontally extending part 31$^a$, beneath which is mounted the holding and camming arm 32; while above part 31$^a$ is mounted the spacing spring 13$^b$, the spring 13$^b$ being fastened to the dog by two screws 14$^b$ 14$^b$ and the arm 32 by screw 14$^c$. Spring 13$^b$ and camming arm 32 both extend under holding screw 19$^b$. Holding screw 19$^b$ is threaded in an angle piece 33 which is bolted on to the machine for the purpose. The holding screw 19$^b$ is provided with a lock nut 19$^c$ to hold the screw securely in place after it has been adjusted. The amount of movement of dog 10$^b$ about its pivot 30 on the escapement rocker is regulated by the adjusting screws 34 and 35 which are threaded in lugs 34$^a$ and 35$^a$.

The carriage is connected with the carriage main spring 36 by the ordinary strap 36$^a$ and the main spring is contained in the ordinary spring barrel 37$^a$. Feed dog 9$^b$ normally engages with the rack. Upon depression of any one of the keys 38 38 the feed dog is disengaged from the rack and the cam spacing dog 10$^b$ engaged therewith. It will be noticed that, during the depression of the key, screw 19$^b$ remains stationary, but that the horizontal part 31$^a$, to which spring 13$^b$ is attached, rises. Hence it is obvious that the tension of the spring increases more and more the farther the key is depressed. As soon as the key has been depressed sufficiently to disengage the feed dog 9$^b$ from the rack and to engage cam spacing dog 10$^b$ therewith, the main spring 36 tends to draw the dog 10$^b$ into its forward position in contact with screw 35. The spring 13$^b$ is not sufficiently strong to hold the dog in its rearward position, even when the key is fully depressed and spring 13$^b$ thereby fully tensioned. Hence if no other means were provided the main spring would draw the dog forward into engagement with screw 35 while the key was fully depressed. In order to avoid this, so as to guard against blurring the print, etc., I have provided the holding and camming arm 32 for the dog. This arm extends underneath holding screw 19$^b$, but does not contact therewith in the normal unused condition of the machine. During the depression of the key however the arm 32 is swung upward and contacts with screw 19$^b$, thereby preventing the dog from being moved into its forward position by the main spring until after the release of the key. I have made arm 32 in the form of a powerful spring. The strength of the arm is sufficient to prevent it from being overcome by the main spring, and consequently the main spring cannot move the dog forward until after the release of the key. But on the other hand in case arm 32 contacts with holding screw 19$^b$ before the key is fully depressed the resiliency of the arm will permit it to be flexed sufficiently to fully depress the key. The arm 32 may be made resilient as herein described, or it may be made entirely rigid. And in the same way the holding points 19 and 19$^a$ of the holding and swiveling plates of the two above described constructions may either be made entirely rigid or resilient as just described, or any of the other parts may be resilient for the same purpose. For instance, in the drawings I have shown connecting wires 28 formed into spiral springs 28$^b$ between the escapement cross bar 8$^b$ and the universal bar 29. Springs 28$^b$ should be powerful enough to successfully resist the main spring and hold the dog 10$^b$ in its rearward position, thereby preventing feed of the carriage while the key is depressed; but in case arm 32 is rigid, the yielding of springs 28$^b$ will still allow of a further depression of the keys for printing after arm 32 has contacted with screw 19$^b$.

In the drawings I have, for the purpose of illustration, shown arm 32 made resilient and connecting wires 28 provided with springs 28$^b$. In practice however I would only make the arm or the connecting wires resilient. Connecting wires 28, with their springs 28$^b$, may be used with the escapements of Figs. 1 to 7 and 8 to 16 and then, in case the plates 17 and 12$^a$ are made entirely rigid the springs 28$^b$ will still permit further depression of the keys after arm 16 of dog 10 has contacted with point 19 of plate 17, and after arm 26$^a$ of swiveler 26 has contacted with point 19$^a$ of plate 12$^a$.

In the style of machine shown herein the let off in the escapement occurs upon a partial depression of the keys, as for instance one half or two thirds. Thus in the construction of Figs. 17 to 29, dog 9$^b$ is disengaged from the rack 5$^b$ when the keys are say one half depressed, or in other words the let off in the escapement occurs when the keys are half way depressed. But, since the type bars 39 are, as in the ordinary Remington structure, loosely connected to the key levers 27 by means of connecting wires 41, turn buckles 41$^a$ and loops 42, if the keys are struck a quick staccato or piano blow and thereby half way depressed, the types 39$^b$ will be driven to the platen thereby and caused to print. In this case there will be no retraction of the carriage by the blow on the keys. On the other hand if the keys are struck a legato or organ blow and fully depressed, after the let off has occurred in the escapement, the carriage will first feed forward and then be retracted by the blow on the keys.

The type bar connecting wires 41 are each composed of two parts, the one above the other below turnbuckle $41^a$. The upper part of each connecting wire is at its upper end bent over and hooked into the short end of a type bar and at its lower end is threaded to fit into the turnbuckle $41^a$. The lower part of each connecting wire is threaded at its upper end to fit into turnbuckle $41^a$ and at its lower end is pivotally connected with a connecting wire loop 42 by means of a pin $42^a$ riveted through loop 42 and extending through a hole bored out to receive it in the lower end of the connecting wire 41. The turnbuckles are each tapped out at one end with a left handed thread and at the other end with a right handed thread, and the engaging ends of the two parts of the connecting wire are similarly threaded to match the threads in the turnbuckles. Therefore by revolving the turnbuckles in one direction the connecting wires are lengthened and by revolving them in the opposite direction the connecting wires are shortened. The purpose of this adjustment will be hereinafter described.

In the modification of Figs. 30 to 40 the carriage $1^c$ is mounted at the rear on rollers $2^d$ supported by guide rail $3^c$. The escapement wheel $5^c$ is rigidly mounted on a shaft $22^a$ which extends through support $23^a$ and on its opposite end is provided with a pinion $24^a$, engaging with the carriage rack $25^a$. In this construction the escapement wheel $5^c$ is of larger diameter than the pinion $24^a$, as in Figs. 8 to 16, and hence its engaging teeth move with the carriage and relatively thereto at a higher rate of speed than that at which the carriage feeds. Upon the escapement rocker $6^k$ the feed dog $9^c$ and the swivel dog $10^f$ are mounted for engagement with the escapement wheel. The escapement rocker may be connected with the key levers by cross bar $8^c$, adjustable connecting wires $41^c$ and a universal bar, in the ordinary manner, or by connecting wires of the character of wires 28, and their nuts $28^a$ and springs $28^b$, of Figs. 17 to 29. The feed dog engages the escapement wheel and the swivel dog is disengaged in the normal or unused condition of the machine. Upon the depression of a key the feed dog is disengaged from the escapement wheel and the swivel dog engages therewith. The feed dog is then spaced rearwardly into a normal central position and held there by its spacing spring $11^c$.

A pin $10^g$ is driven tightly down into a socket in the rocker $6^k$, and is provided with a shank which is driven into the socket, a shoulder part which rests upon the top of the socket and limits the depth to which the pin can be driven, and a shank above the shoulder, forming the pivot of the swivel dog $10^f$. The swivel dog is bored out to fit over and rotate upon the upper shank of pin $10^g$ prepared to receive it. The swivel dog may be prevented from being drawn up off from the top of the pin $10^g$ by any suitable means, as for instance by a small pin driven through the top of pin $10^g$ above the dog.

In Figs. 30 to 40 I have also shown an adjustable screw and means connected therewith for accurately locating the normal central position of feeding dog $9^c$, when out of the escapement wheel. The feeding dog spring holder $13^c$ is pivoted at its lower end upon the escapement rocker $6^k$ by feeding dog spring screw $14^d$. This screw is provided with a threaded part $14^e$ which fits into the escapement rocker, and with a shank $14^f$ a little larger than the threaded part and of such length that it forms a pivot for the spring holder $13^c$ to rotate upon. The screw is also provided with a larger body $14^g$ about which the feeding dog spring $11^c$ is coiled, and with a head $14^h$ larger than the body portion, whereby spring $11^d$ is prevented from accidentally becoming disengaged from the escapement rocker. Thus the spring and holder are separately journaled upon screw $14^d$, each being held in its proper position and prevented from becoming disarranged upon the rocker.

At its upper end the spring holder $13^c$ is provided with a bent over part having two slots $13^d$ $13^d$ through which the upwardly extending ends of spring $11^c$ pass. The two slots $13^d$ $13^d$ constitute guards to hold the two ends of the spring in place and are separated from each other by a tongue $13^e$, so that the opposite ends of the spring press against the opposite sides of tongue $13^e$ to control the downwardly extending end $9^d$ of feed dog $9^c$. The spring holder $13^c$ is also provided with the curved slot $13^f$ which is concentric with the hole $13^g$ through which screw $14^d$ passes. The escapement rocker is bored out and threaded in line with slot $13^f$ to receive screw $14^i$ which is inserted through the rocker from the rear side thereof and passes through the rocker and through the slot $13^f$ of the spring holder. A nut $14^j$ is provided formed out of round wire tapped out and milled away for a short distance upon one end, the milling being in parallelism upon two sides of the nut, and of such width that the milled part or tongue fits into slot $13^f$ of the holder. The nut is milled off to such a depth that the tongue $14^s$ so formed, extends nearly but not quite through the slot $13^f$.

The screw 14$^i$ having been passed through the escapement rocker is screwed into the nut 14$^j$, thereby drawing the nut down into slot 13$^f$ and serving to clamp spring holder 13$^e$ securely to the rocker after it has been properly positioned thereon so that the two ends of spring 11$^e$ will control the feed dog normally in the desired central position. It will be noted that the screw 14$^i$ is inserted into the rocker from the rear side thereof. This is done so as to bring the slotted head of the screw upon the outer side of the escapement rocker when the rocker is in position upon the machine, whereby the screw may be readily loosened for shifting the adjustment of the spring holder without removing the escapement rocker from the machine. I have also provided an adjusting screw 14$^k$ for accurately and easily shifting the spring holder 13$^e$ upon the rocker. The screw 14$^k$ comprises a nurled head 14$^m$, a body part 14$^n$, a neck 14$^o$ in the body part to receive a pin 13$^h$ riveted into the spring holder 13$^e$, and a threaded end 14$^p$ whereby the screw 14$^k$ may be screwed into or out of the rocker to shift the position of the neck which controls the pin 13$^h$ and the spring holder 13$^e$. Thus the shifting of screw 14$^k$ into or out of the rocker serves to also shift the position of holder 13$^e$ upon the rocker, and to thereby shift the position of the upper ends of spring 11$^e$ and correspondingly to shift the central position in which feed dog 9$^c$ is normally held when out of the rack.

The escapement rocker is bored out to receive the body 14$^n$ of screw 14$^k$ at one edge of the rocker, and toward the other edge of the rocker, at the bottom of the hole bored out to receive the body 14$^n$, the hole is bored smaller and tapped out to receive the threaded end 14$^p$ of screw. From the front side of the rocker a hole is bored into the screw hole for body 14$^n$ of screw 14$^k$, about in line with and below the lower end 9$^d$ of dog 9$^c$. This hole is of such a size as to permit pin 13$^h$ to pass therethrough into the controlling neck 14$^o$ of adjusting screw 14$^k$, and the hole is also of sufficient size to permit a considerable movement of the pin 13$^h$ therein, whereby holder 13$^e$ may be shifted upon the rocker. In order to operate this device for shifting the normal central position of dog 9$^c$, all that is necessary to do is to loosen up screw 14$^i$ from the rear side of the machine; then turn the nurled head 14$^m$ of screw 14$^k$ so as to move the nurled head toward or away from the edge of the rocker, as may be desired, until the feed dog 9$^c$ has been properly positioned in its normal central position; when upon re-tightening screw 14$^i$ from the rear side of the rocker, the adjustment is complete. The entire operation of shifting the adjustment to alter the normal central position of the feed dog can therefore be accomplished without removing the escapement rocker from the machine. The escapement rocker is pivotally mounted upon centers 6$^e$, and its rearward movement upon the machine is limited by screw 6$^m$ which is threaded through the rocker and contacts with the machine frame. A lock nut 6$^n$ is provided for screw 6$^m$.

In Figs. 8 to 16 the repulser spring 6$^f$ is shifted and controlled on the rocker 6$^a$ in substantially the same manner that dog spring 11$^e$ is shifted and controlled on rocker 6$^k$ in Figs. 30 to 40; the pivot screw, adjusting screw and pin, being substantially similar in both cases.

In Figs. 30 to 40 I have not shown the spring 6$^f$ of Figs. 8 to 16, but such a spring may be advantageously used with the escapement of Figs. 30 to 40; and on the other hand spring 11$^e$ and its adjusting means of Figs. 30 to 40 may be advantageously employed with the constructions of Figs. 1 to 7, 8 to 16 and 17 to 29. In Figs. 30 to 40 I employ a spring 6$^o$, which to a certain extent actuates escapement rocker 6$^k$ as spring 6$^f$ actuates rocker 6$^a$. Spring 6$^o$ is mounted upon plate 12$^b$, both the plate and the spring being fastened to the top plate of the machine by the screws 14$^q$ and 18$^b$ and the plate also being fastened by screw 18$^c$. The spring 6$^o$ and the plate 12$^b$ are both adjustable on the top plate, the screw 14$^q$ serving as a pivot therefor and screws 18$^b$ and 18$^c$ serving to clamp the parts securely in place when they are properly adjusted.

Spring 6$^o$ is provided with a hole about the size of screw 14$^q$, through which screw 14$^q$ is inserted, and the spring is provided with an adjusting slot for screw 18$^b$, said slot being concentric with the hole for screw 14$^q$. Plate 12$^b$ is provided with holes for screws 14$^q$, 18$^b$ and 18$^c$, considerably larger than the screws so that the plate can be freely adjusted on the machine in all directions.

Plate 12$^b$ is provided with a notch 19$^d$ which is in line with an inwardly extending finger 16$^b$ upon dog 10$^f$ when the dog is in its rearward position on the rocker. Upon the depression of a key for printing, finger 16$^b$ passes into notch 19$^d$ about the time that dog 9$^e$ disengages from the escapement wheel, and dog 10$^f$ is prevented from swiveling by notch 19$^d$ as long as finger 16$^b$ remains in the notch, thereby preventing feed of the carriage as long as the depressed key is held down.

Upon the release of the key, finger 16$^b$ is pushed out of the notch by spring 6$^o$, and then dog 10$^f$ may be swiveled into its forward position by the carriage main spring, and the carriage may thus be advanced while dog 10$^f$ is being disengaged from the escapement wheel 5$^c$. The limit of the forward swiveling movement of the dog upon the rocker is controlled by pin 6$^p$ driven into the top of the rocker. When dog 10$^f$ is in contact with pin 6$^p$ it presents its carriage controlling face in an inclined plane to the tooth of the escapement wheel with which it is engaged, whereby the main spring is instrumental for disengaging dog 10$^f$ from the escapement wheel, lifting the depressed key, moving the type bar toward normal position, etc. Pin 6$^p$ may be discarded altogether or so placed that the swiveling movement of the dog, moves it entirely out of the escapement wheel upon the escape of finger 16$^b$ from notch 19$^d$, but dog 9$^c$ should first reënter the wheel. I also mount upon the top plate the spring holding plate 12$^c$. This holder is fastened to the top plate by screws 14$^r$ and 18$^d$, and holds the swivel dog spring 13$^l$. The plate is provided with a slot 18$^e$ for screw 18$^d$, concentric with the hole 18$^f$ through which screw 14$^r$ passes, the slot serving as a means whereby plate 12$^c$ may be adjusted on the top plate to alter the tension of spring 13$^l$. The end of plate 12$^c$ nearest dog 10$^f$ is bent upwardly and through the bent up part there is a small hole 18$^g$ for the short end of spring 13$^l$, the long end of the spring passing through a slot 18$^h$ in the bent up part, whereby the spring can be flexed inwardly with dog 10$^f$ when a key is depressed and the rocker 6$^k$ swung inwardly on the machine. The hole 18$^g$ and the slot 18$^h$ are separated by a tongue 18$^i$, and spring 13$^l$ is formed so that it presses against the opposite sides of the tongue 18$^i$, the tongue thus serving to hold spring 13$^l$ under tension, whereby dog 10$^f$ is swiveled and held in its rearward position on the rocker when out of the escapement wheel, and whereby spring 13$^l$ exerts a force on dog 10$^f$ for swinging rocker 6$^k$ outwardly on the machine so as to disengage dog 10$^f$ from the escapement wheel after the release of a depressed key.

Upon the release of a depressed key, springs 6$^o$ and 13$^l$ assist each other in starting the rocker and dogs back to normal position, but as soon as finger 16$^b$ has been moved out of notch 19$^d$ spring 6$^o$ collides with a screw or pin 20$^a$ which limits its outward movement on the machine. As soon as finger 16$^b$ has escaped from the notch the main spring is free to swivel the dog forwardly and during the latter part of the return movement of the rocker and dogs the carriage main spring and spring 13$^l$ act together to effect such return movement of the parts to normal position. The spring 13$^l$ instead of passing over the top of the dog, as in the case of Figs. 1 to 7, passes through a small hole provided for it in the dog. Preferably the end of finger 16$^b$ or the holding face of notch 19$^d$, or both finger and notch, may be rounded or beveled so that the finger may more readily and surely enter the notch, and for other purposes which will be pointed out hereinafter. The ordinary Remington main spring and mechanism may be employed.

In all the four constructions which I have above shown and described it will be noticed that the dog springs 13, 13$^a$, 13$^b$ and 13$^l$ are tensioned to a greater degree the farther the key is depressed. Hence they each of them exert a variable pressure upon the dog to hold it in its rearward position to control the carriage. In the construction shown in Figs. 1 to 7 and 30 to 40 it will also be noticed that the main spring exerts a variable swiveling tension upon the dogs 10, and 10$^f$ respectively. This is owing to the fact that while the key is fully depressed the main spring acts with a short leverage to swivel the dog, because the rack is nearer in line with the shaft of the swiveling dog; whereas after the release of the key the main spring acts on the dog with an increasing leverage as the shaft of the swiveling dog moves away from the rack.

In the several constructions herein shown, in Figs. 1 to 7, 8 to 16 and 30 to 40 respectively, there is, broadly speaking, a swiveling member which permits feed of the carriage to commence as soon as a depressed key is released, and means coöperating with the swiveling member to prevent feed of the carriage until after the release of a depressed key. In the construction shown in Figs. 1 to 7, the two parts above enumerated are respectively the swiveling dog 10 (which is the swiveling member) and the holding point 19 (which is the part coöperating therewith); in Figs. 8 to 16 the swiveling member is the swiveler 26 and the part coöperating therewith to prevent feed is the holding point 19$^a$; and in Figs. 30 to 34 the swiveling member is the swiveling dog 10$^f$ and finger 16$^b$, and the part coöperating therewith to prevent feed is the plate 12$^b$ and the notch 19$^d$ therein, into which the finger 16$^b$ is moved by the depression of a key to effect the printing. I use the term swiveling member in this broad sense in the claims.

The operation of my escapement device is as follows: In the construction of Figs. 1 to 7 the escapement rocker 6 is held in its normal position by swivel dog spring 13. This spring also normally holds dog 10 in its rearward or uninclined position, in parallelism with dog 9 when dog 9 is in its forward position in engagement with the rack, as shown in Figs. 1, 2 and 3. Upon the depression of a key the feed dog 9 is disengaged from the rack and swivel dog 10 engaged therewith. As soon as dog 9 has been disengaged from the rack and dog 10 engaged therewith the carriage propelling power, tending to draw the carriage forward together with rack 5, tends to swivel dog 10 from its uninclined position in engagement with the rack, shown in Fig. 4, to its inclined position, shown in Fig. 5. But, while the key is fully depressed, dog 10 engages through spring 13 with the dog holding and swiveling plate 17; and plate 17 prevents the dog from being swiveled by the carriage propelling power as long as the key is held down. Upon the release of the key the carriage propelling power swivels the dog into its forward inclined position, shown in Fig. 5. During this movement the swivel dog holding arm 16 remains substantially stationary at the point where it engages with point 19 of the holding and swiveling plate. The point 19, therefore, acts as a fulcrum, and the dog 10 becomes a lever acted on by the carriage propelling power; whereby the carriage propelling power swings the escapement rocker 6 outwardly, thus disengaging dog 10 from the rack and reëngaging dog 9 therewith. The swinging of the dog into its forward position results in a very speedy feeding movement of the carriage during the disengaging movement of dog 10 from the rack; and, while in its forward position, the dog presents its face to the rack in an inclined plane, upon which the carriage propelling power may act to disengage the dog from the rack and to return the escapement rocker 6 to its normal position, in case the front face 10ᶜ of the dog contacts with the abutment 6ᶜ of the escapement rocker before dog 10 has been fully disengaged from the rack. That is, after face 10ᶜ has come into engagement with abutment 6ᶜ, thereby limiting the swiveling of the dog upon the rocker, point 19 ceases to act as a fulcrum for swinging the escapement rocker outwardly by the pull of the propelling power, since any outward movement of the escapement rocker must then swing the holding arm 16 of the dog outwardly away from point 19. But since the dog 10 is then in its forward position with its carriage controlling face inclined to the line of feed of the rack, the carriage propelling power will act upon the inclined controlling face of the dog to complete the disengagement of the dog from the rack after its front face 10ᶜ has come into contact with abutment 6ᶜ of the escapement rocker. It will thus be seen that the swiveling of dog 10 into an inclined position is effective for disengaging the dog during the latter part of the feeding movement of the carriage when abutment 6ᶜ of the escapement rocker is so placed that the dog 10 will have been swiveled into engagement therewith prior to the total disengagement of the dog from the rack.

The abutment 6ᶜ of the escapement rocker is so placed relatively to the front face 10ᶜ of the dog, and to point 19 of the holding plate, that face 10ᶜ contacts with abutment 6ᶜ before the dog is wholly disengaged from the rack. Therefore in this construction, as shown, after the dog has been swiveled into the position of Fig. 5, with face 10ᶜ contacting with abutment 6ᶜ and arm 16 with point 19, the dog 10 will, during the remainder of its disengagement from the rack, act substantially as a fixed beveled dog; being operated upon by the carriage propelling power, through the carriage, to cause the rack to run down the inclined face of the dog, thereby wholly disengaging the dog from the rack.

If the abutment 6ᶜ is so placed as to engage with the dog before the total disengagement of the dog from the rack, the carriage controlling face of the dog will, after such engagement, act as a beveled or inclined carriage controlling face whereby the main spring may operate for disengaging dog 10 from the rack, for lifting the key, and for moving the type bar away from the printing point, as in the case of the ordinary fixed beveled dog.

By a "beveled" or "inclined" carriage controlling face I mean a face located obliquely to the direction of the feeding movement of the spaced member of the escapement, or obliquely to the line of movement in the escapement for effecting the engagement of the face with the other member and its disengagement therefrom, whereby the part of the face in engagement with the other member will be located at successive intervals of the engagement at different points relatively to the line of feed of the spaced member, so that the position of the spaced member may be varied as the said face is more or less fully engaged. This inclination of an engaging part permits the carriage to be advanced in the line of feed for printing while the disengagement of the parts is taking place; and such inclination may also be instrumental in effecting many other important functions, as for example the retraction of the spaced member during the engagement with the other member of the part with its carriage controlling face so inclined, and the restoration of working parts to their normal positions by aid of the carriage propelling power after the printing. Of course rounded or curved faces are the equivalents of plane beveled or inclined faces.

Where the abutment 6ᶜ of the rocker is placed as I have shown it, so that the front face 10ᶜ will contact therewith before the dog 10 is wholly disengaged from the rack, spring 13 may be discarded at will, the dog 10 being then swiveled rearwardly during the depression of the keys by the direct contacting of arm 16 with holding point 19. Particularly is this true if the escapement wheel of Figs. 8 to 16 be substituted for the rack of Figs. 1 to 7, since the spaces between the teeth in the escapement wheel are so much larger than the spaces between the teeth in the simple rack that the dog is less liable to collide with an escapement wheel tooth than with a simple rack tooth while being swiveled rearwardly by point 19 during the depression of a key. In case spring 13 is dispensed with in Figs. 1 to 7, the spring 6$^f$ of Figs. 8 to 16 together with its adjustments, should preferably be incorporated in the escapement. In fact spring 6$^f$ and its adjustments can be advantageously used in the escapement of Figs. 1 to 7, and also in the escapement of Figs. 30 to 40, in any event with beneficial results. It is, however, obvious that, since the plate 17 is adjustably mounted on the machine, the holding point 19 may be so positioned as that the holding arm 16$^a$ of dog 10 will engage therewith until the swivel dog is wholly disengaged from the rack, in which case the front face 10$^c$ of the dog will not engage the abutment 6$^c$ during any part of the swiveling movement of the dog, but the complete disengagement of the dog 10 from the rack will be effected by the pull of the main spring acting through the rack and dog on holding point 19, as hereinbefore described.

In Figs. 30 to 40 if spring 6$^f$ is employed, spring 6$^o$ may, if desired, be dispensed with, and in that case finger 16$^b$ will be drawn out of notch 19$^d$ by means of said spring 6$^f$.

During the depression of the key the carriage may be cammed backward, as well as fed forward, according to the style of blow used by the operator. If the operator strikes a staccato or piano blow, and only drives the key part way down, the carriage will begin its forward feed slightly during the depression of the key, and will not be retracted to any appreciable extent. But if the operator uses the legato or organ blow, driving the key down slowly and fully depressing it, the dog 10 will commence to swivel into its forward inclined position as soon as dog 9 is disengaged from the rack, and before the engagement of holding arm 16 of the dog with point 19 of the holding plate 17 thereby permitting a forward feed of the carriage. Then as the key is still further depressed dog 10 will be returned into its rearward uninclined position thereby retracting the carriage.

I wish to call attention to the fact that, in the construction of Figs. 1 to 7, swivel dog spring 13 exerts the least tension in the normal unused condition of the machine, shown in Figs. 1, 2 and 3; and that it exerts a stronger tension in the positions shown in Figs. 4 and 5, since in these latter views the spring 13 is flexed by the inward movement of the escapement rocker 6, and also in Fig. 5 by the swiveling of dog 10 into its forward position by the carriage propelling power. I would also call attention to the fact that the effective pull of the carriage propelling power for swiveling dog 10 into its forward position is less when the key is fully depressed, shown in Fig. 4, than it is when the key is partially lifted and the dog is escaping from the rack, as shown in Fig. 5. The reason for this is that the leverage presented by dog 10 to be acted on by the carriage propelling power is less when the key is fully depressed than it is when the key is being lifted and the dog is being disengaged from the rack. This is because the pivot of dog 10 is closer to the rack when the key is fully depressed, as shown in Fig. 4, than it is after the release of the key while the dog is being disengaged from the rack. Therefore the pull of the propelling power becomes more and more effective for swiveling dog 10 during the disengaging movement of the dog from the rack until the dog is fully disengaged therefrom. I would also call attention to the fact that increasing the tension of the carriage propelling power increases the speed of the carriage feed and the speed at which the dog is swiveled into its forward inclined position, as well as increases the speed with which dog 10 is disengaged from the rack and the escapement rocker 6 moved outwardly upon the machine. Another means for increasing the speed with which the escapement rocker 6 is swung outwardly on the machine, so as to disengage dog 10 from the rack and reëngage dog 9 therewith after the release of the key, is to increase the tension of spring 13 by shifting the right hand end of the spring inwardly on the machine and engaging it with one of the inner spring holding slots 21.

A feature which the modification of Figs. 8 to 16 illustrates is the fact that the swiveler may be an independent piece. In this construction feed dog 9$^a$ normally engages with the escapement wheel 5$^a$ and the dog 10$^a$ is normally disengaged, as shown in Figs. 9, 10 and 13. Upon the depression of a key the escapement rocker 6$^a$ is rocked inwardly on the machine, thereby disengaging feed dog 9$^a$ from the escapement wheel and engaging dog 10$^a$ therewith, as shown in Figs. 11 to 14. In this construction the point 26$^a$ of the swiveler 26 engages with point 19$^a$ of plate 12$^a$, to hold the dog 10$^a$ from moving forward while the key is fully depressed; and, as in Figs. 1 to 7, the forward feed of the carriage may begin on the down stroke of the key; and if the key is slowly and fully depressed the carriage may be retracted, that is to say, drawn back, as above described. The dog 10$^a$ moves backward and forward on the escapement rocker 6$^a$ in parallelism with feed dog 9$^a$, and presents its engaging face to the escapement wheel in an uninclined plane both while in its forward position and also while in its rearward position. Hence the parts should be so arranged and adjusted that arm 26$^b$ of the swiveler will not contact with the limiting pin 6$^d$ until dog 10$^a$ is fully disengaged from the rack, because dog 10$^a$, being uninclined while in its forward position, cannot be acted upon as an inclined plane by the propelling power to complete the disengagement of the dog from the rack. Therefore, while in Figs. 1 to 7 abutment 6$^c$ of the escapement rocker may be so placed as to contact with dog 10 before the dog is totally disengaged from the rack, but after it has been swiveled into its forward inclined position, in the construction of Figs. 8 to 16 the dog 10$^a$, being at all times uninclined, should be wholly disengaged from the escapement wheel by aid of the arm 26$^a$ of swiveler 26, the arm 26$^a$ remaining in engagement with point 19$^a$ of plate 12$^a$ until the total disengagement of the dog from the rack. Therefore it is plain that in this latter construction my means for disengaging dog 10$^a$ from the escapement wheel by the force of the propelling power consist in swiveler 26 and the parts operative therewith; while on the other hand in Figs. 1 to 7 the first part of the disengagement of dog 10 from the rack is effected by the propelling power by means of the swiveling of the dog, and the latter part of the disengagement of the dog therein may be effected by the swiveling of the dog or by the inclination of its carriage controlling face according as to whether or not the dog contacts with abutment 6$^c$ of the rocker before total disengagement of the dog from the rack.

In Figs. 17 to 29 the spring 13$^b$ spaces the dog 10$^b$ rearwardly while out of engagement of the rack; but the spring 13$^b$ is so weak that as soon as dog 10$^b$ engages with the rack 5$^b$ and dog 9$^b$ is disengaged therefrom, it will, unless otherwise prevented, immediately be overcome by the carriage propelling power, consisting of main spring 36 contained in spring barrel 37$^a$, and the dog 10$^b$ thereby drawn into its forward position, thus permitting feed of the carriage while the key is depressed. In order to obviate this I have provided the holding and camming arm 32, which is carried by the dog and brought into engagement with screw 19$^b$ when the key is depressed. This arm, in the form which I have shown, is a stout spring which may be overcome by the blow on the key after it has been brought into engagement with screw 19$^b$, but which is powerful enough to resist the main spring and hold the dog in its rearward position as long as the key is depressed, as well as to retract the carriage in case it feeds too far forward prior to the printing.

Screw 19$^b$ should be adjusted so as to hold dog 10$^b$ in the desired position while the keys are fully depressed; the adjustment of the screw determining whether any or how much feed of the carriage shall occur prior to the printing. Screw 34 prevents dog 10$^b$ from being spaced rearwardly too far. The adjustments of screws 19$^b$ and 34 are advantageous in regulating the rearward movement of dog 10$^b$ by spring 13$^b$ while the dog is out of the rack, as well as the position in which it is held by arm 32 during the printing; and by varying the adjustments of screws 19$^b$ and 34 either all feed of the carriage prior to the printing may be prevented or any desired proportion of such feed may be effected prior to the printing. The adjustment of screw 19$^b$ is also advantageous in regulating the rearward movement of dog 10$^b$ in connection with different adjustments of the let off in the machine; and in a similar manner, in Figs. 1 to 7, 8 to 16 and 30 to 40, all feed of the carriage may be prevented, or any desired portion, prior to the printing, by properly adjusting plates 17, 12$^a$ and 12$^b$ respectively for the purpose, together with a corresponding adjustment of the let off in the machine.

The let off in the machine is regulated by the nuts 28$^a$ at the lower ends of the universal bar connecting wires 28, (the length of which wires determines how far inward the escapement rocker 6$^b$ will swing upon a given depression of the keys,) and by turnbuckles 41$^a$, which, regulating the lengths of the type bar connecting wires 41, limit the depression of the keys. While such nuts and turnbuckles in the universal bar wires and in the type bar connecting wires are only shown in Figs. 17 to 29, it will be understood that they may also be used in the construction of Figs. 1 to 7, 8 to 16 and 30 to 40; and that plates 17, 12$^a$ and 12$^b$ of the latter constructions are provided with adjustments on the machine so that the swiveled dogs therein may be held in the desired position by plates 17, 12$^a$ and 12$^b$ when all of the other connections are properly adjusted.

With the several escapements herein shown it is of great importance that the adjustments between the escapement and the several type bars be accurately made, so that the carriage will be positioned at the same point by each of the keys when each of the keys is fully depressed and the connected type severally brought the one after the other to the printing point. My mechanism for regulating and changing the adjustments between the escapement and keys and between the keys and printing members, is shown in Figs. 17 to 29 only, but I wish it to be understood that I may employ similar mechanism with the other escapements shown and described herein.

The usual mechanism for winding up and unwinding the main spring and for securing it when tensioned are shown in Fig. 20, and consist of handle 38$^a$ attached to the ratchet wheel 38$^b$ of spring barrel 37$^a$, and ratchet 39ᶜ having handle 40ᵃ, such mechanism and its functions being also applicable to Figs. 1 to 7, 8 to 16 and 30 to 40.

In my said Patent # 617,798 I have described and claimed the repulser effect of the carriage propelling power, operative through the swiveling dog therein, for cushioning the keys when depressed, whereby a springy and agreeable touch is imparted to the keys and whereby the carriage propelling power assists the operator in lifting the keys after the printing stroke thereon. The several constructions shown and described herein are each operative for transmitting the repulser effect of the carriage propelling power through the escapement to the keys. Thus in Figs. 1 to 7 as soon as dog 9 is disengaged from the rack and dog 10 engaged therewith, the carriage propelling power, drawing the rack forward with the carriage, tends to swivel dog 10 into its forward inclined position. But this can only be effected by lifting the key, because of the engagement of arm 16 of the dog with holding point 19 of plate 17. Likewise, in Figs. 8 to 16, as soon as dog 9ᵃ has been disengaged from the escapement wheel and dog 10ᵃ engaged therewith, the carriage propelling power, drawing carriage rack 25 forward with the carriage, together with escapement wheel 5ᵃ, tends to move dog 10ᵃ into its forward position, which can only be done by lifting the key because of the engagement of arm 26ᵃ of the swiveler 26 with the holding point 19ᵃ of plate 12ᵃ.

In Figs. 17 to 29 as soon as dog 9ᵇ has been disengaged from the rack and dog 10ᵇ engaged therewith, the main spring 36, drawing the carriage 1ᵇ and rack 5ᵇ forward, tends to move dog 10ᵇ forward on the rocker 6ᵇ, and to thereby restore the rocker to normal position and lift the key. In Figs. 30 to 40 the pull of the carriage propelling power tends to lift the key while the beveled end of finger 16ᵇ is engaged with the beveled edge of notch 19ᵈ.

In the construction of Figs. 30 to 40, less friction is caused by the swiveling movement in the escapement than that caused thereby in Figs. 1 to 7 and 8 to 16. This is due to the fact that swiveling dog 10ᶠ is bored out and inserted over upwardly extending pin 10ᵍ, whereas dog 10 and swiveler 26 are provided with downwardly extending shanks which are inserted into sockets prepared to receive them in the escapement rockers 6 and 6ᵃ. A pin of the character of 10ᵍ may be employed in Figs. 1 to 7 and 8 to 16 as well as in Figs. 30 to 40. In Figs. 30 to 40 the spaced member and carriage cannot be over-retracted by the blow on the keys, owing to the fact that carriage controlling faces of dog finger 16ᵇ and notch 19ᵈ, which engage together when the parts are fully engaged, are unbeveled and uninclined.

By an "unbeveled" or "uninclined" carriage controlling face I mean a face located at right angles to the direction of the feeding movement of the spaced member, or parallel to the line of movement in the escapement for effecting the engagement and disengagement of the face with the other member, whereby the part of the face in engagement with the other member will be located at successive intervals of the engagement at the same point relatively to the line of feed of the spaced member, so that the position of the spaced member will not be varied as the said face is more or less fully engaged. Hence, since the faces of finger 16ᵇ and notch 19ᵈ, which engage together while the keys are fully depressed, are unbeveled and uninclined, it is obvious that no movement of the spaced member or of the carriage will occur in case the finger 16ᵇ is driven deeper into the notch after the unbeveled faces have come into their controlling engagement. It therefore follows that in case plate 12ᵇ is so adjusted on the machine as to bring said unbeveled faces into engagement slightly before the full depression of the keys, the subsequent movement of the keys while being fully depressed will not operate either for feeding or for retracting the carriage, but that during such subsequent depression of the keys the carriage and spaced member of the escapement will remain stationary.

In Figs. 1 to 7, 8 to 16 and 17 to 29 means are also provided for preventing over retraction of the carriage. In Figs. 1 to 7 such means consist of abutment 6ᵃ on rocker 6, and face 10ʰ which contacts therewith and limits the rearward swiveling of dog 10. In Figs. 8 to 16 such means consist of stop piece 45 on the rocker 6ᵃ, which piece limits the rearward movement of dog 10ᵃ on the rocker. In Figs. 17 to 29 such means consist in stop screw 34 which limits the rearward movement of dog 10ᵇ on rocker 6ᵇ.

Referring to Figs. 32, 33 and 34, it will be noticed that I have beveled or inclined the point of arm 16ᵇ which first engages with notch 19ᵈ, and that I have beveled or inclined the edge of the face of the notch 19ᵈ which first engages with arm 16ᵇ. This beveling allows arm 16ᵇ to more surely and easily enter the notch upon the depression of a key; permits the carriage to begin its feeding movement after the release of the key while the beveled faces of the dog arm and notch are disengaging; and enables the main spring to assist in the reëngagement of the normally engaging parts in the escapement, in the lifting of the key and in moving the type bar away from the printing point. Also in case plate 12ᵇ is so placed on the machine that dog 9ᶜ will be fully disengaged from the escapement wheel 5ᶜ before the unbeveled face of arm 16ᵇ is in line with the unbeveled face of the notch, the carriage can begin its feeding movement prior to the printing upon a partial depression of a key, and may then be retracted again upon a further depression of the key. Preferably plate 12$^b$ should be so adjusted on the machine that with a staccato blow, where the key is only partially depressed for printing, the carriage will begin its feeding movement prior to the printing and will not be retracted, the unbeveled faces of the arm and notch not being brought into engagement at all, whereas with the legato blow wherein the key is fully depressed the carriage will be retracted and the unbeveled faces of the arm and notch engaged together.

By reason of the enlarged holes in plate 12$^b$ through which screws 14$^a$, 18$^b$ and 18$^c$ pass, the plate may be adjusted on the machine so that the unbeveled holding face of notch 19$^d$ will be in line with the unbeveled holding face of arm 16$^b$, when dog 10$^f$ is in its normal rearward or uninclined position, whereby all feed of the carriage will be prevented until after the printing by the engagement of said unbeveled holding faces with each other; or the holding face of the notch may be set out of line of the holding face of the arm so as to allow any desired portion of the feed to occur prior to the printing by the swiveling of the dog before arm 16$^b$ contacts with the holding face of the slot.

Where springs of the character of springs 28$^b$, of Figs. 17 to 29, are employed with the constructions of Figs. 8 to 16 or of Figs. 30 to 40, the strength of such springs may be much less in the two latter constructions than in the former. The reason of this is that the escapement wheels 5$^a$ and 5$^c$, respectively of Figs. 8 to 16 and 30 to 40, constitute a power reducing gearing, whereby only a reduced portion of the force of the main spring for positioning the carriage, can be transmitted through the escapement to said connecting wire springs. In a similar manner where holding points 19 and 19$^a$, respectively of Figs. 1 to 7 and 8 to 16, are made in the form of springs, it is obvious that point 19$^a$ may be upon a much weaker spring than point 19. This is because of the power reducing gearing of escapement wheel 5$^a$, owing to the fact that the diameter of escapement wheel 5$^a$ is much longer than the diameter of pinion 24. Also, owing to the power reducing gearing between pinion 24 and escapement wheel 5$^a$, carriage 1$^a$, of Figs. 8 to 16, can be held in opposition to the main spring by a force applied to the keys less than the force required to be applied to the keys to hold the carriage 1 in Figs. 1 to 7; and for the same reason the carriage 1$^a$ and escapement wheel 5$^a$ may be retracted in opposition to the main spring by less force applied to the keys than the force necessary therefor with the carriage 1 and rack 5.

In Figs. 1 to 7, as well as in Figs. 8 to 16, the carriage and spaced member of the escapement can be held, by force applied to the keys, from advancing under the influence of the main spring; and can be retracted, while the normally disengaged dog is engaged with the spaced member. But in Figs. 1 to 7 more power must be applied to rack 5, for the purpose, than the force of the main spring for positioning the carriage; while in Figs. 8 to 16 the carriage and escapement wheel may be held and retracted in opposition to the main spring, by less force applied to the escapement wheel than that of the main spring for positioning the carriage. The reason for this is that Figs. 8 to 16 are provided with a power reducing gearing, while Figs. 1 to 7 are not so provided.

In the drawings, escapement wheel 5$^a$ is more than twice the diameter of pinion 24; and consequently any force of the main spring applied to pinion 24 to advance the pinion with the carriage, may be successfully opposed and the feed of the carriage prevented by the application of less than one half the same force to escapement wheel 5$^a$ from the keys to hold the carriage in opposition to the main spring. In a similar manner, if the escapement wheel were three times the diameter of the pinion, any force applied by the main spring through the carriage to the pinion, would be successfully opposed by one third of the same force applied from the keys to the escapement wheel; while in case the escapement wheel were four times the diameter of the pinion, the force applied by the main spring to the pinion would be successfully opposed by one fourth of the same force applied to the escapement wheel; and it may be stated generally that the force applied to the pinion may be successfully resisted by an opposing force applied to the escapement wheel, where the force applied to the escapement wheel is in the same proportion relatively to the force of the main spring as is the diameter of the escapement wheel to the diameter of the pinion. I do not wish to be limited by the relative sizes of the escapement wheel and pinion in the drawings but intend in practice to make the proportions of the two whatever size I find most desirable.

It will be apparent from the above that the constructions which I show in Figs. 8 to 16 and 30 to 40, constitute a means whereby the carriage may be held and retracted by the application from the keys to the escapement of a force less powerful than the carriage propelling power to position the carriage. I designate broadly this herein as a power reducing gearing.

The use of an escapement wheel of larger diameter than the pinion, in Figs. 8 to 16 and 30 to 40, is advantageous not only in the fact that the depressed key can be held down by a less force applied to the key and the carriage retracted against the pull of the main spring by a smaller force applied to the key, as above described, but it also affords a means whereby the normally disengaged dog may be forced out of the rack after release of the key and the normally engaged dog reëngaged therewith, the depressed key lifted and its connected type bar started back from the platen by the force of the main spring, quicker than where a slow moving rack, (i. e., one moving at only the same speed as the carriage), is employed, as in Figs. 1 to 5 and 17 to 29. In other words the relatively quick moving escapement wheel of Figs. 8 to 16 and 30 to 40, effects a better synchronism between the several moving parts, under the pull of the main spring, than does the relatively slow moving rack of Figs. 1 to 7 and 17 to 29.

I wish to call attention to the fact that plate 12$^b$ may be discarded from the escapement altogether and dog 10$^f$ prevented from swiveling, until after the release of the depressed key, by the pressure of arm 16$^b$ against spring 6$^o$, the spring being mounted directly on the top plate of the machine or otherwise. In this case the spring should be so adjusted as to press against pin 20$^a$ with such force as to cause a degree of friction between the arm 16$^b$ and spring 6$^o$ sufficient to prevent the swiveling of the dog while a key is held down and the spring thereby pressed inwardly on the machine away from pin 20$^a$.

By the terms "forward position" and "rearward position" of the movable dog, as used in the claims, I refer to the positions assumed by that dog respectively under the pull of the carriage propelling power and in opposition thereto, or under the pull of the spacing spring when the dog is released from the action of the carriage propelling power. For instance, the movable or feeding dogs shown herein are held in their "rearward positions" by their spacing springs when out of engagement with the rack, and they are moved into their "forward positions" by the carriage propelling power during their engagement with the racks. These terms are used in the same general sense that they are used in the several patents above referred to herein. The term "printing member" is used herein in the general sense that it is used in the said above mentioned patents.

In the claims where I state that the printing members are connected with the keys for movement to and from the printing point, I mean thereby that the printing members are so connected with the keys that when a key is depressed its printing member must be moved toward the printing point, and when a key is lifted from its depressed position its printing member must be drawn back from the printing point. Thus in Fig. 18 the type bars 39 are connected with keys 38 by means of connecting wires 41, so that each type bar is positively moved toward the printing point when its key is depressed and is positively drawn back from the printing point when its key is lifted.

Having thus described my invention, what I claim and desire to secure by Letters Patent is:

1. In a typewriter escapement, the combination of a rack, an escapement mechanism therefor having a movable dog adapted to alternately engage and disengage with the rack, said dog being so disposed as to present its rack-engaging face in a plane parallel to that of the engaging face of the rack tooth; for engagement with the rack, and having a limited swiveling movement to cause it to present its engaging face to the engaging face of the rack tooth at an angle thereto, and a plate mounted independently of said escapement mechanism and operative upon the dog when the dog is engaged with the rack to hold the dog from swiveling, substantially as described.

2. In a typewriter escapement, the combination of a rack, an escapement mechanism therefor having a movable dog adapted to alternately engage and disengage with the rack, said dog being so disposed as to present its rack-engaging face in one plane for engagement with the rack, and having a limited swiveling movement, a plate mounted independently of said escapement mechanism and operative upon the dog when the dog is engaged with the rack to hold the dog from swiveling, and means operated by the carriage propelling power for swiveling the dog, to cause the dog to present its said face to the rack in another plane, which said other plane is oblique to the direction of the feeding movement of the escapement, substantially as described.

3. In a typewriter escapement, the combination of a rack, an escapement mechanism therefor having a movable dog adapted to alternately engage and disengage with the rack, said dog being so disposed as to present its rack-engaging face in one plane for engagement with the rack, and having a limited swiveling movement, a plate operative upon the dog when the dog is engaged with the rack to hold the dog from swiveling, and means operated by the carriage propelling power for swiveling the dog by aid of said plate, to cause the dog to present its said face to the rack in another plane, and to disengage the dog from the rack, substantially as described.

4. In a typewriter escapement, the combination of a rack, an escapement mechanism therefor having a normally disengaged movable dog adapted to alternately engage and disengage with the rack, said dog being so disposed as to present its rack-engaging face in one plane for engagement with the rack, and having a limited swiveling movement, a plate operative upon the dog when the dog is engaged with the rack to hold the dog from swiveling, and means operated by the carriage propelling power for swiveling the dog to cause the dog to present its said face to the rack in another plane, and thereby permit of a partial feed of the escapement while the dog is being disengaged from the rack, substantially as described.

5. In a typewriter escapement, the combination of a rack, an escapement mechanism therefor having a movable dog adapted to alternately engage and disengage with the rack, said dog being normally disengaged and so disposed as to present its rack-engaging face in one plane for engagement with the rack, and having a limited swiveling movement, a key for engaging said dog with the rack, means operated by the carriage propelling power, during the depression of a key, to cause the dog to swivel after its engagement with the rack and thereby permit of a partial feed of the carriage, and a swiveling plate mounted independently of said escapement mechanism and operative on the dog during the latter part of the depression of the key, whereby the dog may be swiveled in the reverse direction to retract the carriage, substantially as described.

6. In a typewriter escapement, the combination of a rack, an escapement mechanism therefor having a movable dog adapted to alternately engage and disengage with the rack, said dog being normally disengaged and so disposed as to present its rack-engaging face in one plane for engagement with the rack, and having a limited swiveling movement, a key for engaging said dog with the rack, means operated by the carriage propelling power, during the depression of a key, to cause the dog to swivel after its engagement with the rack and thereby permit of a partial feed of the carriage, whereby said dog may be engaged with the rack, the printing effected, the carriage fed and said dog disengaged from the rack, upon a partial depression of the key and without retracting the rack, and a plate which engages with the dog for retracting the rack upon a complete depression of the key, substantially as described.

7. In a typewriter escapement, the combination of a rack, an escapement mechanism therefor having a swiveling dog adapted to alternately engage and disengage with the rack, said dog being capable of a limited movement and positioned with its swiveling end facing the rack, means for moving the dog bodily toward and into engagement with the rack, an arm on the dog and a fixed plate which engage together to hold the dog from swiveling when the dog is fully engaged with the rack and which are operated upon by the carriage propelling power while the dog is engaged with the rack to swivel the dog into an oblique position and effect a partial feed of the carriage, substantially as described.

8. In a type-writing machine, the combination of a power-driven carriage, an escapement to control the feed thereof comprising a rack and an escapement rocker with a pivoted, spring-pressed dog mounted thereon that is normally out of engagement with the rack but adapted to engage therewith, said dog being positioned with its spring pressed end facing the rack, means for moving the dog bodily toward and into engagement with the rack, an arm on the dog and a fixed plate which engage together to hold the dog from swiveling when the dog is fully engaged with the rack and which are operated upon by the carriage propelling power while the dog is engaged with the rack to swivel the dog into an inclined position and effect a partial feed of the carriage and a partial disengagement of the dog from the rack, and an abutment on the rocker which contacts with the dog when swiveled into its inclined position, whereby the total disengagement of the dog from the rack is effected by aid of the abutment on the rocker, the inclined rack engaging face of the dog and the carriage propelling power operative thereon, substantially as described.

9. In a type-writing machine, the combination of an escapement, a key to operate the escapement, a printing member, a connection between the key and the printing member whereby the printing member is operated by the key to effect the printing, a carriage that is spaced under control of the escapement, a carriage-controlling obliquely-swiveling feeding element for releasing the carriage during the disengagement of said element from the other member of the escapement, means for advancing the carriage when so released, a fixed plate operative upon the feeding element while the key is depressed to hold the feeding element from the swiveling, and a connection between the carriage-advancing means and the printing member, through the feeding element, the plate and the key, whereby the printing member is moved toward normal position by the swiveling of the feeding element under the pull of the carriage propelling power, substantially as described.

10. In a type-writing machine, the combination of an escapement, a key to operate the escapement, a repulser for the key, a carriage that is spaced under control of the escapement, a carriage-controlling obliquely-swiveling feeding element for releasing the carriage during the disengagement of said element from the other member of the escapement, means for advancing the carriage when so released, a fixed plate operative upon the feeding element while the key is depressed to hold the feeding element from swiveling, and a connection between the carriage-advancing means and the key, through the feeding element and the plate, when the key is depressed, whereby the key is started back to its raised position by the swiveling of the feeding element under the pull of the carriage propelling power, substantially as described.

11. In a type-writing machine, the combination of an escapement, a key to operate the escapement, a repulser for the key, a type-bar, a connection between the key and the type-bar whereby the type-bar is operated by the stroke of the key to effect the printing, a carriage that is spaced under control of the escapement, a normally-disengaged carriage-controlling obliquely-swiveling feeding-dog for releasing the carriage during the disengagement of said dog from the rack member of the escapement, a carriage main spring for advancing the carriage when so released, a fixed plate operative upon the feeding dog while the key is depressed to hold the feeding dog from swiveling, and adjustable connections between the carriage-main spring and the key and the type-bar, through the feeding dog and the plate, when the key is depressed, whereby the key is raised and the type bar moved back toward normal position by the swiveling of the feeding dog under the pull of the carriage main spring, substantially as described.

12. In a typewriter escapement, the combination of two engaging members, one of which comprises an element that normally engages with the other member and a normally-disengaged element, a carriage-controlling part having an obliquely-swiveling feeding face on the normally disengaged element, a fixed plate operative upon the normally disengaged element when that element is engaged with the other member to hold the feeding face from swiveling, and means for adjusting said plate to regulate the swiveling of the feeding face, substantially as described.

13. In a typewriter escapement, the combination with the carriage, of an escapement wheel having engaging teeth movable with the carriage and relatively thereto at a rate of speed higher than that at which the carriage feeds, a normally disengaged dog movably mounted on the escapement rocker and a rigid stop arranged and adapted to engage said dog and prevent its movement on the rocker and to thereby control the carriage in its printing position when a key is depressed and said dog engaged with the escapement wheel, substantially as described.

14. In a typewriter escapement, the combination with the carriage, of an escapement wheel having engaging teeth movable with the carriage and relatively thereto at a rate of speed higher than that at which the carriage feeds, and a normally disengaged dog movably mounted on the escapement rocker, a key and connections for engaging the dog with the escapement wheel, means operated by the carriage main spring for feeding the escapement wheel forward with the dog during the engagement of the dog and wheel, and a support brought into engagement with the dog and adapted to move the dog and escapement wheel backward during the latter part of a slow hesitating key stroke, substantially as described.

15. In a typewriter escapement, the combination with the carriage, of an escapement wheel having engaging teeth movable with the carriage and relatively thereto at a rate of speed higher than that at which the carriage feeds, a normally disengaged dog movably mounted on the escapement rocker, a key and connections for engaging the dog with the escapement wheel, and a support in engagement with the dog when the dog and wheel are engaged together, and means operated by the carriage main spring, through the escapement wheel and said support, for disengaging the said dog and wheel, substantially as described.

16. In a type-writer escapement, the combination of a vibratory rocker and a reciprocating element, two yielding and spring controlled stops which normally hold the reciprocating element in a position intermediate between the limits of its forward and backward vibration, means to limit the movement of the said yielding stops and determine their normal positions, and an adjusting screw and means operated thereby for shifting the normal positions of said stops, substantially as described.

17. In a type-writer escapement, the combination of a dog-carrying rocker-frame and a spacing-dog mounted thereon, two yielding and spring-controlled stops on the rocker-frame which normally holds the dog in a position intermediate between the limits of its forward and backward vibration, a fixed stop to limit the movement of the said yielding stops and determine their normal positions, and an adjusting screw and means operated thereby for shifting the position of said fixed stop, substantially as described.

18. In an escapement mechanism, the combination with a spaced member, of a pivoted dog engaging therewith, a spring device holding the dog in a central intermediate position but permitting it to be moved to either side of such position, and an adjusting screw and means operated thereby for shifting the position of said spring device, substantially as described.

19. In an escapement mechanism, the combination with a spaced member, of a spacing rocker and a pivoted dog mounted thereon, spring mechanism normally under tension mounted wholly on the rocker, holding the dog in a central intermediate position thereon and returning it to the said central position when moved to either side thereof, and an adjusting screw and means operated thereby for shifting the position of said spring mechanism, substantially as described.

20. In a type-writing machine, the combination of a rack, a spacing-rocker and a pivoted dog mounted thereon and capable of occupying three different positions, a spring stop mechanism on the rocker tending to keep the dog in the central or intermediate position on the rocker, and an adjusting screw and means operated thereby for shifting the position of the spring stop mechanism, substantially as described.

21. In a type-writer escapement, the combination of a pivoted dog, two yielding and spring-controlled stops which normally hold the dog in a position intermediate between the limits of its forward and backward vibration, means to limit the movement of the yielding stops and determine their normal positions, and an adjusting screw and means operated thereby for shifting the normal positions of said yielding stops, substantially as described.

22. In an escapement, the combination with a rack of a pivoted dog which engages therewith and is made in a single piece, a single spring part for holding the dog in a central intermediate position and for returning the dog into that position after movement to either side thereof, and an adjusting screw and means operated thereby for shifting said spring, substantially as described.

23. In an escapement, the combination with a rack of a spacing-rocker and a pivoted dog mounted thereon which is made in a single piece and engages with the rack, a spring mechanism mounted wholly on the spacing-rocker for holding the dog normally under tension on the rocker in a central intermediate position and for returning the dog into that position after movement to either side thereof, and an adjusting screw and means operated thereby for shifting the position of the spring mechanism, substantially as described.

24. In an escapement, the combination of two pivoted dogs, each of which moves upon its pivot and permits a part of the spacing movement, one of which has a normal central position irrespective of the position of the other dog and can be moved to either side of said central position, and an adjusting screw and means operated thereby for shifting said normal central position, substantially as described.

25. In an escapement, the combination of two independently-spring-positioned pivoted dogs, one of said dogs being normally held in a central intermediate position and capable of movement to either side thereof, and an adjusting screw and means operated thereby for shifting said normal central position, substantially as described.

26. In an escapement, the combination of a spacing-rocker, two pivoted dogs mounted thereon, one of which is spring supported in a central intermediate position upon the rocker, the other of which has a spring supported independently of the rocker, and an adjusting screw and means operated thereby for shifting said central intermediate position, substantially as described.

27. In an escapement, the combination of two pivoted dogs, each of which moves upon its pivot and permits a part of the spacing movement, one of which has a normal central position irrespective of the position of the other dog and can be moved to either side of said central position, means operated by the type-keys for positioning one of said dogs, and an adjusting screw and means operated thereby for shifting said normal central position, substantially as described.

28. In an escapement, the combination of two independently-spring-positioned pivoted dogs, one of said dogs being normally held in a central intermediate position and capable of movement to either side thereof, means operated by the type-keys for positioning one of said dogs, and an adjusting screw and means operated thereby for shifting said central intermediate position, substantially as described.

29. In a typewriter escapement, the combination of a rack, an escapement mechanism therefor having a swiveling dog adapted to alternately engage and disengage with the rack, and having its face in an uninclined position when fully engaged with the rack and in an inclined position while being disengaged from the rack, said dog being provided with a limited movement and positioned with its swiveling end facing the rack, a key for moving the dog bodily toward and into engagement with the rack, a plate mounted on a part independent of the escapement mechanism for holding the dog when engaged with the rack, a printing member connected with the key for movement to the printing point, and an adjustable connection between the key and the printing member, substantially as described.

30. In a typewriter escapement, the combination with the carriage, of an escapement wheel having engaging teeth movable with the carriage and relatively thereto at a rate of speed higher than that at which the carriage feeds, a normally disengaged dog movably mounted on the escapement rocker, a key and connections for engaging the dog with the escapement wheel, a support in engagement with the dog when the dog and wheel are engaged together, and means operated by the carriage main spring, through the escapement wheel, dog and support, for lifting the key from its depressed position, substantially as described.

31. In a typewriter escapement, the combination of a rack, an escapement mechanism therefor having a movable dog adapted to alternately engage and disengage with the rack, said dog being so disposed as to present its rack engaging face in one plane for engagement with the rack, and having a limited swiveling movement, a plate operative upon the dog when the dog is engaged with the rack to hold the dog from swiveling, and springs in the connecting wires between the escapement and key levers arranged and adapted to permit further movement of the keys and their connected type bars after the movement in the escapement has been arrested, substantially as described.

32. In a typewriter escapement, the combination of a part in one member which normally engages with the other member and a part which is normally disengaged, means for engaging said normally disengaged part with the other member, and a spring connection between the escapement and the keys, said spring connection being more powerful for positioning the carriage in opposition to the carriage propelling power, while a key is depressed, than the force of the carriage propelling power for advancing the carriage, substantially as described.

33. In a typewriter escapement, the combination with a rack, of a dog which normally engages therewith, a dog which is normally disengaged and movable relatively to the normally engaged dog, means for engaging said movable dog with the rack, rigid means operative upon said movable dog when in engagement with the rack for holding the dog in its rearward position in opposition to the carriage propelling power, and springs in the connecting wires between the escapement and key levers, said springs in the connecting wires being more powerful for positioning the carriage in opposition to the carriage propelling power, while a key is depressed, than the force of the carriage propelling power for advancing the carriage, substantially as described.

34. In a typewriter escapement, the combination of a rack, an escapement mechanism therefor having a movable dog adapted to alternately engage and disengage with the rack, said dog being so disposed as to present its rack engaging face in an uninclined plane for engagement with the rack, and having a limited swiveling movement, a plate operative upon the dog when the dog is engaged with the rack to hold the dog from swiveling, and springs in the connecting wires between the escapement and key levers, said springs in the connecting wires being more powerful for positioning the carriage in opposition to the carriage propelling power, while a key is depressed, than the force of the carriage propelling power for advancing the carriage, substantially as described.

35. In a typewriter escapement, the combination of a rack, a swiveling dog adapted to alternately engage and disengage with the rack, and having its face in an uninclined position when fully engaged with the rack and in an inclined position while being disengaged from the rack, means for moving the dog toward and into engagement with the rack, and a swiveling plate fixedly attached to the machine and in engagement with the dog while the dog is engaged with the rack, said dog and plate being operated on by the carriage main spring to swivel the dog while the dog is engaged with the rack.

36. In a typewriter escapement, the combination with the carriage, of an escapement wheel having engaging teeth movable with the carriage and relatively thereto at a rate of speed higher than that at which the carriage feeds, a normally disengaged dog movably mounted on the escapement rocker, a key lever and connections for engaging the dog with the escapement wheel, a printing member operatively connected with the key lever for positive movement to and from the printing point by the depression and return movement of the lever, a support in engagement with the dog when the dog and wheel are engaged together, and means operated by the carriage main spring, through the wheel, dog, support, and lever, for starting the printing member away from the printing point, substantially as described.

Signed by me in New York city, this 26th day of April, 1900.

WILLIAM G. BABCOCK.

Witnesses:
EDWIN S. HUNT,
GEORGE H. GILMAN.